US011100875B2

(12) United States Patent
He

(10) Patent No.: US 11,100,875 B2
(45) Date of Patent: *Aug. 24, 2021

(54) DISPLAY PANEL, DISPLAY DEVICE AND DRIVING METHOD

(71) Applicant: HKC Corporation Limited, Shenzhen (CN)

(72) Inventor: Huai Liang He, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/954,408

(22) PCT Filed: Jan. 15, 2018

(86) PCT No.: PCT/CN2018/072644
§ 371 (c)(1),
(2) Date: Jun. 16, 2020

(87) PCT Pub. No.: WO2019/119577
PCT Pub. Date: Jun. 27, 2019

(65) Prior Publication Data
US 2021/0082361 A1 Mar. 18, 2021

(30) Foreign Application Priority Data
Dec. 19, 2017 (CN) .......................... 201711377053.5

(51) Int. Cl.
G09G 3/36 (2006.01)

(52) U.S. Cl.
CPC .......... G09G 3/3614 (2013.01); G09G 3/3607 (2013.01); G09G 3/3648 (2013.01); G09G 2300/0452 (2013.01); G09G 2320/0242 (2013.01)

(58) Field of Classification Search
CPC .......... G09G 3/3614; G09G 2320/0209; G09G 2320/0242; G09G 3/3696; G09G 3/3655; G09G 2310/027; G09G 2320/028; G09G 3/3611–3/3666; G09G 3/3685–3/3692
See application file for complete search history.

(56) References Cited

U.S. PATENT DOCUMENTS

2016/0351137 A1* 12/2016 Lee ...................... G09G 3/3614
2018/0114478 A1* 4/2018 Tien ..................... G09G 3/3614

FOREIGN PATENT DOCUMENTS

CN 107180606 B 3/2020
CN 107272282 B 5/2020

* cited by examiner

Primary Examiner — Sanjiv D. Patel
(74) Attorney, Agent, or Firm — WPAT, PC

(57) ABSTRACT

A display panel, a display device and a driving method are provided. In the display panel, the subpixels input with the first voltage data signal and the subpixels input with the second voltage data signal are alternately arranged; and the number of the subpixels input with the first voltage data signal with a positive polarity is equal to the number of the subpixels input with the first voltage data signal with a negative polarity among the subpixels with a same color in a same row.

4 Claims, 18 Drawing Sheets

DISPLAY PANEL, DISPLAY DEVICE AND DRIVING METHOD

FIELD OF THE DISCLOSURE

The disclosure relates to a display technical field, and more particularly to a display panel, a display device and a driving method.

BACKGROUND

Liquid crystal display panels with the vertical alignment (VA) mode are equipped on large-sized liquid crystal displays due to advantages such as high production efficiencies, low manufacturing costs and the like. In order to solve the problem of color shift of large-sized liquid crystal displays at wide angles, in a conventional liquid crystal display, data signals corresponding to an original image is divided into a high voltage signal and a low voltage signal; the high voltage signal and the low voltage signal each are input to various pixels.

However, in the liquid crystal display adopting the method above, the number of subpixels of high voltage signals of positive polarities is commonly unmatched with the number of subpixels of high voltage signals of negative polarities, and the common electrode voltage is easy to be shifted under the influence of the stray capacitance, resulting in different quantities of electric charges of the subpixels of the high voltage signals of positive polarities and the subpixels of high voltage signals of negative polarities, and colors shown by the liquid crystal display are incorrect. The output images are degraded, even deformed.

SUMMARY

The disclosure provides a display panel, a display device and a driving method for solving the problem of color shift of large-sized display panels at wide angles. Output images are upgraded and prevented from error occurrence.

The disclosure provides a display panel. The display panel includes: a substrate, a subpixel array disposed on the substrate, data lines configured to input a first voltage data signal and a second voltage data signal to subpixels in the subpixel array.

The substrate is formed with active switches.

The subpixel array includes subpixels.

The data lines and the active switches are coupled.

A voltage of the first voltage data signal is larger than a voltage of the second voltage data signal; the subpixels input with the first voltage data signal and the subpixels input with the second voltage data signal are alternately arranged; among the subpixels with a same color in a same row, the number of the subpixels input with the first voltage data signal with a positive polarity is equal to the number of the subpixels input with the first voltage data signal with a negative polarity.

The disclosure provides a display device, including: a control module, and any one of the display panels of the disclosure; the display panel and the control module are coupled.

The disclosure further provides a driving method, configured to drive the display panel, including: obtaining a first voltage data signal and a second voltage data signal corresponding to pixels in an image according to a display search chart, counting the number of subpixels with the first voltage data signal higher than a first threshold in the subpixels with each color line-by-line as the number of high voltage subpixels of the subpixels with each color, counting the number of subpixels with the second voltage data signal lower than a second threshold in the subpixels with each color line-by-line as the number of low voltage subpixels of the subpixels with each color, calculating a ratio of the number of the high voltage subpixels to the number of the low voltage subpixels corresponding to the subpixels with each color line-by-line, judging whether at least one ratio larger than a predetermined ratio exists line-by-line, if the at least one ratio is larger than the predetermined ratio, marking a pixel row corresponding to the at least one ratio larger than the predetermined ratio as a pixel row affecting image qualities, when the number of pixel rows affecting image qualities in the image meets a predetermined criteria, inputting the first voltage data signal and the second voltage data signal to data lines in the display panel according to a predetermined rule to achieve any one of the display panels of the disclosure.

The disclosure provides the display panel, the display panel and the driving method. The display panel can reduce color shift of the display panel at wide angles, as well as preventing color washout due to the different amounts of the subpixels input with the first voltage data signal with the positive polarity and the subpixels input with the first voltage data signal with the negative polarity so as to upgrade output images.

BRIEF DESCRIPTION OF THE DRAWINGS

In order to better illustrate embodiments of the disclosure, drawings in need for describing the embodiments will be briefly introduced as follows, apparently, the drawings in the description below are some embodiments of the disclosure, and a person skilled in the art can obtain other figures according to the drawings without any creativity.

FIG. 3 through FIG. 14 each are structural schematic views of display panels according to embodiments of the disclosure;

FIG. 16 through FIG. 23 each are structural schematic views of display panels according to embodiments of the disclosure;

DETAILED DESCRIPTION OF PREFERRED EMBODIMENTS

Figure 1:
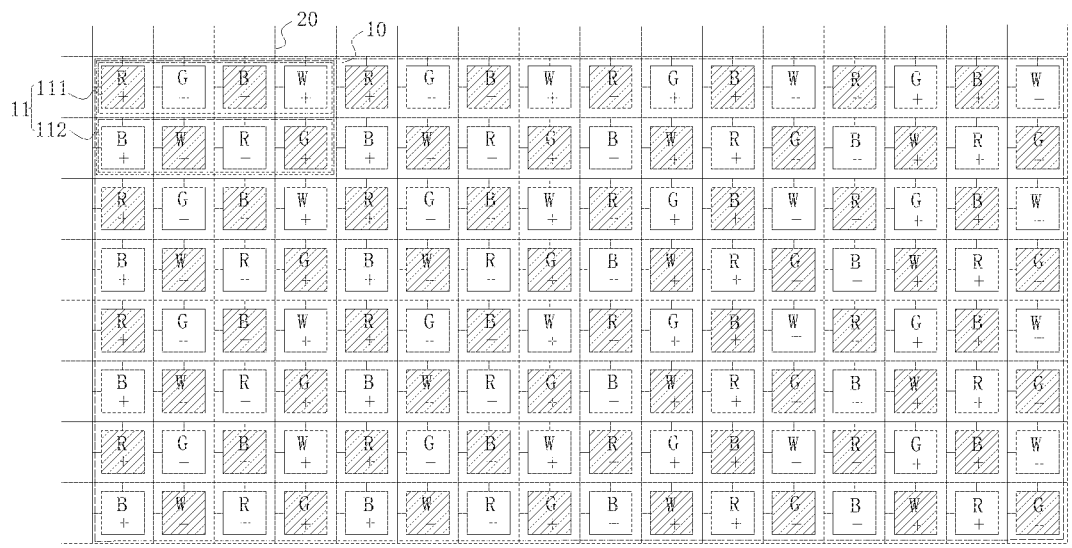
FIG. 1 is a structural schematic view of a display panel according to an embodiment of the disclosure.

The disclosure will be clearly illustrated with reference to accompanying drawings of embodiments and as follows. Apparently, the illustrated embodiments are merely some rather than all of the embodiments of the disclosure. All the other embodiments obtained by a person skilled in the art based on the embodiments in the disclosure without any creativity should belong to the protective scope of the disclosure.

The embodiment provides a display panel. The display panel can be a liquid crystal display panel, an organic light emitting diode (OLED) display panel, a quantum dot light emitting diode (QLED) display panel or other types of display panels without any limitation.

The display panel includes a substrate, a subpixel array and data lines. The substrate is formed with active switches. The subpixel array is disposed on the substrate, including subpixels. The data lines and the active switches are coupled, configured to input data signals to the subpixels so as to fulfill the image display.

Specifically, in the embodiment, the data lines input a first voltage data signal and a second voltage data signal to the subpixels. The voltage of the first voltage data signal is larger than the voltage of the second voltage data signal.

In other words, the display panel divides an original data signal of images to be displayed into the first voltage data signal and the second voltage data signal in space, namely the original data signal is divided into a high voltage data signal and a low voltage data signal in space.

In order to solve the problem of color shift of large-sized display panels at wide angles, in the embodiment, the subpixels input with the first voltage data signal and the subpixels input with the second voltage data signal are alternately arranged.

In an embodiment, specific manners of alternating arranging the subpixels input with the first voltage data signal and the subpixels input with the second voltage data signal include: disposing the subpixel input with the second voltage data signal between two adjacent subpixels in the same row input with the first voltage data signal, disposing the subpixel input with the first voltage data signal between two adjacent subpixels in the same row input with the second voltage data signal, disposing the subpixel input with the second voltage data signal between two adjacent subpixels in the same column input with the first voltage data signal, and disposing the subpixel input with the first voltage data signal between two adjacent subpixels in the same column input with the second voltage data signal.

Apparently, in other embodiments, the specific manners of alternating arranging the subpixels input with the first voltage data signal and the subpixels input with the second voltage data signal can be other ways without any limitation herein.

In the embodiment, when the data lines input the first voltage data signal and the second voltage data signal to the subpixels, among the subpixels with the same color in the same row, the number of the subpixels input with the first voltage data signal with a positive polarity and the number of the subpixels input with the first voltage data signal with a negative polarity should be the same to prevent incorrect colors due to the different amounts of the subpixels input with the first voltage data signal with the positive polarity and the subpixels input with the first voltage data signal with the negative polarity.

For instance, in the first row of the subpixel array, red subpixels and blue subpixels are input with the first voltage data signal, green subpixels and white subpixels are input with the second voltage data signal. Among the red subpixels in the first row, the number of the red subpixels input with the first voltage data signal with the positive polarity and the number of the red subpixels input with the first voltage data signal with the negative polarity are equal. Among the blue subpixels in the first row, the number of the blue subpixels input with the first voltage data signal with the positive polarity and the number of the blue subpixels input with the first voltage data signal with the negative polarity are equal.

Furthermore, in an embodiment, when the data lines input the first voltage data signal and the second voltage data signal to the subpixels, among the subpixels with the same color in the same row, the number of the subpixels input with the second voltage data signal with the positive polarity and the number of the subpixels input with the second voltage data signal with the negative polarity should be the same to further prevent the display panel from outputting incorrect colors and enhance the quality of output images.

For instance, in the first row of the subpixel array, red subpixels and blue subpixels are input with the first voltage data signal, green subpixels and white subpixels are input with the second voltage data signal. Among the green subpixels in the first row, the number of the green subpixels input with the second voltage data signal with the positive polarity and the number of the green subpixels input with the second voltage data signal with the negative polarity are equal. Among the white subpixels in the first row, the number of the white subpixels input with the first second data signal with the positive polarity and the number of the white subpixels input with the second voltage data signal with the negative polarity are equal.

In the display panel of the embodiment, the subpixels input with the first voltage data signal and the subpixels input with the second voltage data signal are arranged alternately, and among the subpixels with the same color in the same row, the number of the subpixels input with the first voltage data signal with the positive polarity and the number of the subpixels input with the first voltage data signal with the negative polarity are identical to prevent color shift of the display panel at wide angles and simultaneously prevent incorrect colors due to the different amounts of the subpixels input with the first voltage data signal with the positive polarity and the subpixels input with the first voltage data signal with the negative polarity. The common electrode voltage is consequently unaffected by the stray capacitance. The output image is upgraded and prevented from error occurrence.

The specific structures such as colors of the subpixels, arrangements, polar arrangement of data signals of the display panel of the embodiment can further be designed according to practical requirements in production and application. Concrete structures of the display panel will be illustrated in detail with reference to FIG. 1 through FIG. 23.

Referring to FIG. 1, FIG. 1 is a structural schematic view of a display panel according to an embodiment of the disclosure. The display panel includes a substrate, a subpixel array 10 and data lines 20. The substrate is formed with active switches. The subpixel array 10 is disposed on the substrate and includes subpixels. The data lines 20 and the active switches are coupled, configured to input data signals to the subpixels to fulfill the image display.

A person skilled in the art can understand the display panel shown in FIG. 1 is not the restriction of the display panel, in other embodiments, the display panel can further include other components such as scan lines, array substrate line driving circuit, driving chips, and the specific structure of the display panel will not be limited herein.

Figure 2:
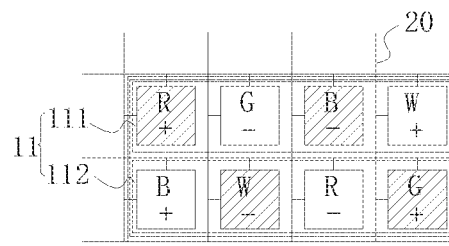
FIG. 2 is a structural schematic view of a pixel group in the display panel shown in FIG. 1.

In the embodiment, the subpixels in the subpixel array 10 can be divided into pixel groups 11, namely the subpixel array 10 includes the pixel groups 11. The pixel group 11 includes the first pixel 111 and the second pixel 112 in the same column. The first pixel 111 and the second pixel 112 are proximate. In order to further clarify the structure of the pixel group 11, referring to FIG. 2, FIG. 2 is a structural schematic view of a pixel group in the display panel shown in FIG. 1.

In the embodiment, the first pixel 111 and the second pixel 112 both include four subpixels, respectively are a red subpixel, a green subpixel, a blue subpixel and a white subpixel. Arrangement sequences of the subpixels in the first pixel 111 and the second pixel 112 are different.

For instance, as shown in FIG. 1, the subpixels of the first pixel 111 are arranged in the sequence of the red subpixel, the green subpixel, the blue subpixel and the white subpixel. The subpixels of the second pixel 112 are arranged in the sequence of the blue subpixel, the white subpixel, the red subpixel and the green subpixel.

Comprehensively, the arrangement sequence of the subpixels in the first pixel 111 and the second pixel 112 is not restricted to FIG. 1, other arrangement sequences are adaptive, and no limitation is setup herein.

Furthermore, the first pixel 111 and the second pixel 112 are in the same column and adjacent. In other words, the red subpixels in the first pixel 111 and the blue subpixels in the second pixel 112 are in the same column and adjacent; the green subpixels in the first pixel 111 and the white subpixels in the second pixel 112 are in the same column and adjacent; the blue subpixels in the first pixel 111 and the red subpixels in the second pixel 112 are in the same column and adjacent; the white subpixels in the first pixel 111 and the green subpixels in the second pixel 112 are in the same column and adjacent.

In the embodiment, when the data lines 20 input the first voltage data signal and the second voltage data signal to the subpixels, the subpixels input with the first voltage data signal and the subpixels input with the second voltage data signal are arranged alternately. The voltage of the first voltage data signal is larger than the voltage of the second voltage data signal.

For instance, in FIG. 1, the red subpixels and the blue subpixels in the first pixel 111, as well as the white subpixels and the green subpixels in the second pixel 112 are input with the first voltage data signal; the green subpixels and the white subpixels in the first pixel 111, as well as the blue subpixels and the red subpixels in the second pixel 112 are input with the second voltage data signal. The pixel group 11 is duplicated in directions of the row and the column of the subpixel array 10 to form the subpixel array 10 with the subpixels input with the first voltage data signal and the subpixels input with the second voltage data signal alternately arranged.

In the embodiments of the disclosure, the direction of the row of the subpixel array 10 indicates the horizontal direction in the drawings. The direction of the column of the subpixel array 10 indicates a vertical direction in the drawings.

In order to reduce heat generated by the driving chip of the display panel, in the embodiment, polarities of the data signals of the subpixels in the same column are the same. For instance, in the first column of subpixels shown in FIG. 1, the subpixels are input with the data signal with positive polarity. For example, in the second column of subpixels shown in FIG. 1, the subpixels are input with the data signal with negative polarity.

In the embodiment, in the direction of the row of the subpixel array 10, the pixel groups 11 in the same row are driven by a first polarity driving manner and a second polarity driving manner Specifically, the first polarity driving manner and the second polarity driving manner are two driving manners with contrary polarities.

For instance, as shown in FIG. 1, the first polarity driving manner is arranged as follows. Polarities of the data signals of the red subpixel, the green subpixel, the blue subpixels and the white subpixels in the first pixel 111 in the pixel group 11 sequentially are positive, negative, positive and negative; polarities of the data signals of the blue subpixel, the white subpixel, the red subpixels and the green subpixels in the second pixel 112 sequentially are positive, negative, negative and positive. The second polarity driving manner is arranged as follows. Polarities of the data signals of the red subpixel, the green subpixel, the blue subpixels and the white subpixels in the first pixel 111 in the pixel group 11 sequentially are negative, positive, positive and negative; polarities of the data signals of the blue subpixel, the white subpixel, the red subpixels and the green subpixels in the second pixel 112 sequentially are negative, positive, positive and negative. In other words, in the pixel groups 11 driven by the first polarity driving manner and the pixel groups 11 driven by the second polarity driving manner, polarities of the data signals of the subpixels at corresponding positions are opposite.

In the embodiment, the pixel groups 11 are driven by the first polarity driving manner and the second polarity driving manner to guarantee the number of the subpixels input with the first voltage data signal with the positive polarity and the number of the subpixels input with the first voltage data signal with the negative polarity to be the same in the subpixels with the same color in the same row, and the number of the subpixels input with the second voltage data signal with the positive polarity and the number of the subpixels input with the second voltage data signal with the negative polarity to be the same in the subpixels with the same color in the same row.

For instance, in the subpixel array 10 shown in FIG. 1, the subpixels in the first row are taken as the example. Among the red subpixels in the first row, the number of the red subpixels input with the first voltage data signal with the positive polarity and the number of the red subpixels input with the first voltage data signal with the negative polarity both are two. Among the green subpixels in the first row, the number of the green subpixels input with the second voltage data signal with the positive polarity and the number of the green subpixels input with the second voltage data signal with the negative polarity both are two.

Comprehensively, in other embodiments, specific forms of the first polarity driving manner and the second polarity driving manner are not restricted to the situations above, and no limitation will be set herein.

In an embodiment, the pixel groups 11 driven by the first polarity driving manner and the pixel groups 11 driven by the second polarity driving manner in the direction of the row of the subpixel array 10 can be combined in various manners.

For instance, in FIG. 1, the pixel groups 11 in pair driven by the first polarity driving manner and the pixel groups 11 in pair driven by the second polarity driving manner are arranged alternately in the direction of the row. In other words, in the direction of the row of the subpixel array 10, two pixel groups 11 driven by the first polarity driving manner as a first pixel group pair, and two pixel groups 11 driven by the second polarity driving manner as a second pixel group pair; one second pixel group pair is disposed between two adjacent first pixel group pairs, and one first group pair is disposed between two adjacent second pixel group pairs.

Figure 3:
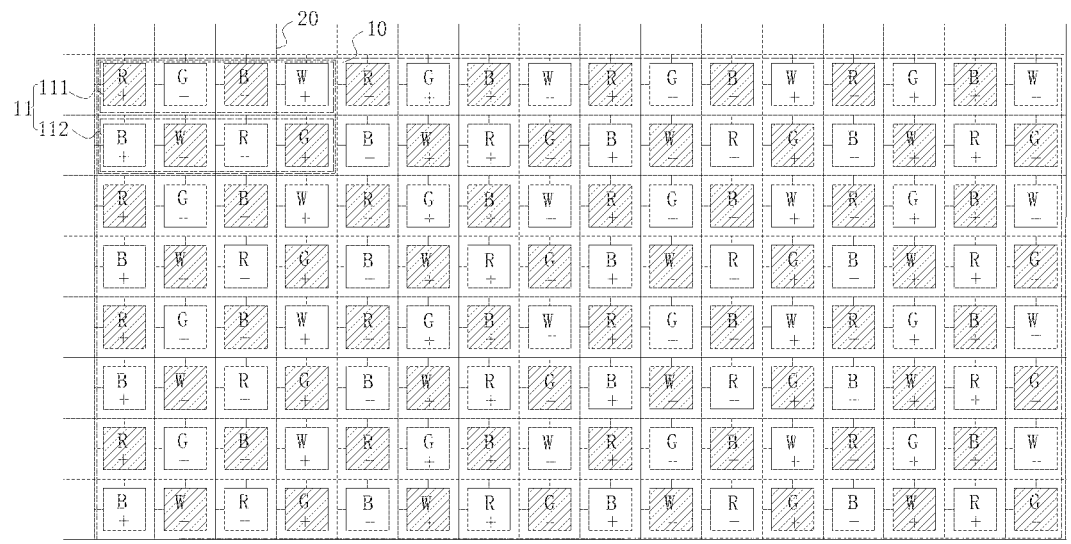

For example, as shown in FIG. 3, FIG. 3 is a structural schematic view of a display panel in an embodiment. In FIG. 3, the pixel groups 11 driven by the first polarity driving manner and the pixel groups 11 driven by the second polarity driving manner are arranged alternately in the direction of the row. In other words, in the direction of the row of the subpixel array 10, one pixel group 11 driven by the second polarity driving manner is disposed between two adjacent pixel groups 11 driven by the first polarity driving manner, and one pixel group 11 driven by the first polarity driving manner is disposed between two adjacent pixel groups 11 driven by the second polarity driving manner.

Figure 4:
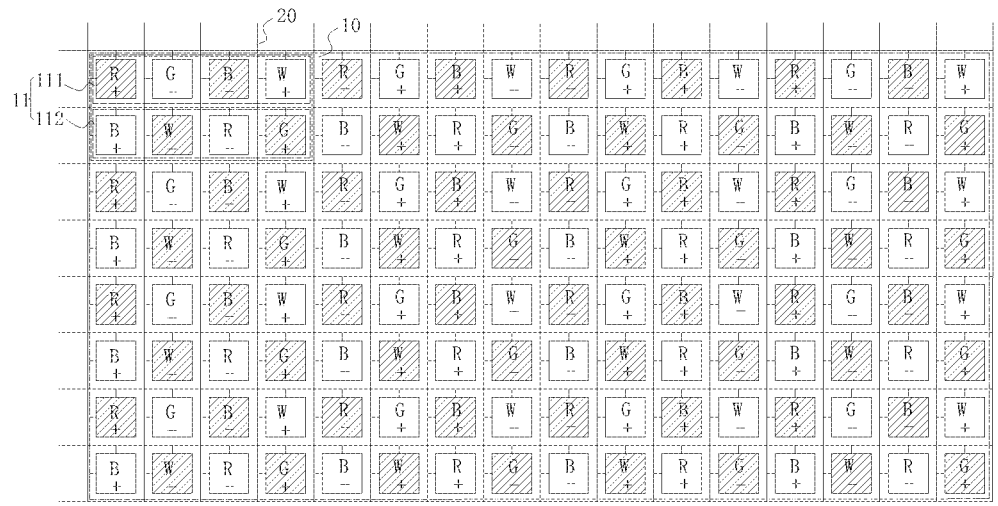

For example, as shown in FIG. 4, FIG. 4 is a structural schematic view of a display panel in an embodiment. In FIG. 4, in the direction of the row of the subpixel array 10, one pixel group 11 driven by the second polarity driving manner is disposed between two adjacent pixel groups 11 driven by the first polarity driving manner, and the arrangement is repeated in the direction of the row to obtain the subpixel array 10 as shown in FIG. 4.

The arrangement and combination manners of the pixel groups 11 driven by the first polarity driving manner and the pixel groups 11 driven by the second polarity driving manner in the direction of the row of the subpixel array 10 are not limited in the manners as described above. Others can be adaptable without any limitation.

Furthermore, in other embodiments, the first pixel 111 and the second pixel 112 each can include three subpixels, respectively are a red subpixel, a green subpixel and a blue subpixel.

Figure 5:
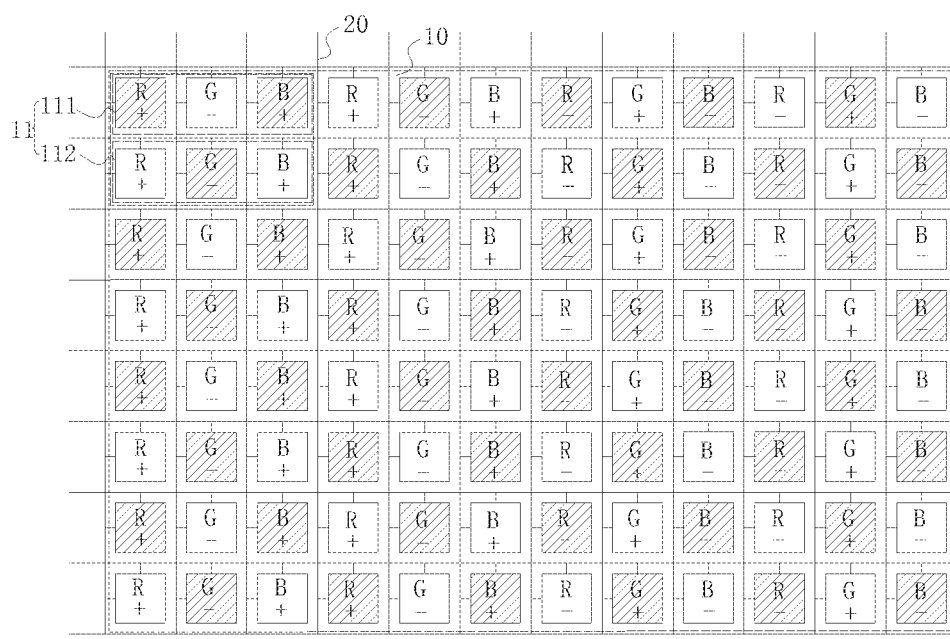

For instance, as shown in FIG. 5, FIG. 5 is a structural schematic view of a display panel in an embodiment. Arrangement sequences of the subpixels in the first pixel 111 and the second pixel 112 are the same. Meanwhile, in the subpixel array 10, polarities of the data signals of the subpixels in the same column are the same. The pixel groups 11 in the same row are driven by the first polarity driving manner and the second polarity driving manner.

In the embodiment shown as FIG. 5, the first polarity driving manner can be arranged as follows. Polarities of the data signals of the red subpixel, the green subpixel and the blue subpixels in the first pixel 111 and the second pixel 112 in the pixel group 11 sequentially are positive, negative and positive. The second polarity driving manner is arranged as follows. Polarities of the data signals of the red subpixel, the green subpixel and the blue subpixel in the first pixel 111 and the second pixel 112 in the pixel group 11 sequentially are negative, positive and negative.

Comprehensively, in the embodiment of the first pixel 111 and the second pixel 112 both including three subpixels, in the direction of the row of the subpixel array 10, the arrangement and combination of the pixel groups 11 driven by the first polarity driving manner and pixel groups 11 driven by the second polarity driving manner are similar to the situation of the first pixel 111 and the second pixel 112 both including subpixels with four colors. And for the purpose of clarifying the disclosure, no repeat will be included herein.

The display panel in the embodiment can reduce color shift of the display panel at wide angles, as well as preventing incorrect colors due to the different amounts of the subpixels input with the first voltage data signal with the positive polarity and the subpixels input with the first voltage data signal with the negative polarity. The common electrode voltage is consequently free from the affection of the stray capacitance. The output image is upgraded and prevented from error occurrence.

Figures 6, 7:
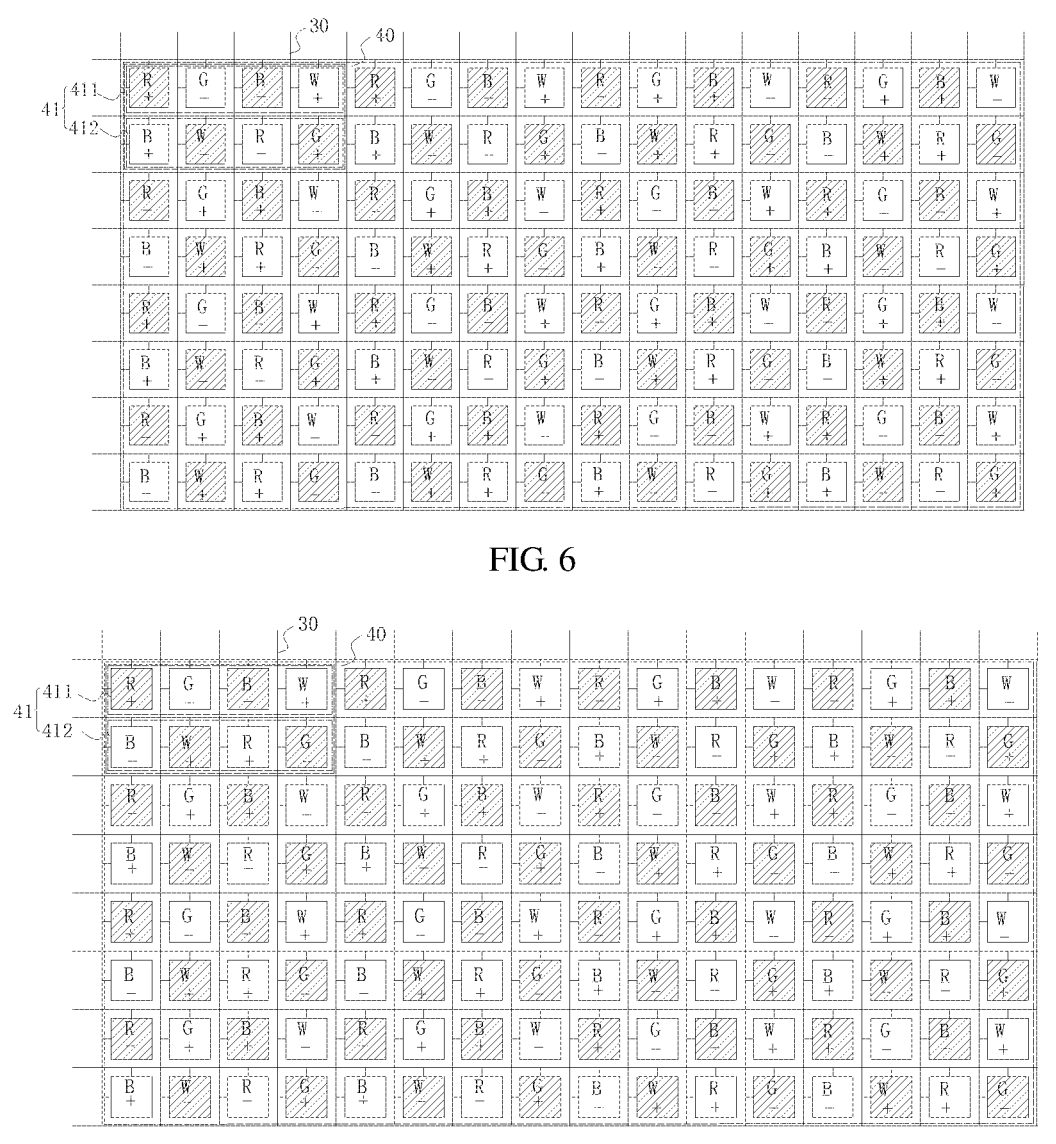

Referring to FIG. 6, FIG. 6 is a structural schematic view of a display panel in an embodiment. The display panel includes a substrate, data lines 30 and a subpixel array 40. The substrate is formed with active switches. The subpixel array 40 is disposed on the substrate, including pixel groups 41. The data lines 30 and the active switches are coupled, configured to input data signals to the subpixels in the subpixel array 40 so as to fulfill the image display.

A person skilled in the art can understand the structure of the display panel shown in FIG. 6 is not the restriction of the display panel, in other embodiments, the display panel can further include other components such as scan lines, an array substrate line driving circuit, driving chips, and the specific structure of the display panel will not be limited herein.

The pixel group 41 includes a first pixel 411 and a second pixel 412 in the same column, and the first pixel 411 and the second pixel 412 are proximate. The first pixel 411 and the second pixel 412 both include four subpixels, respectively are a red subpixel, a green subpixel, a blue subpixel and a white subpixel. Arrangement sequences of the subpixels in the first pixel 411 and the second pixel 412 are different, as shown in FIG. 6. Comprehensively, the arrangement sequence of the subpixels in the first pixel 411 and the second pixel 412 is not restricted to the circumstance shown in FIG. 6, other arrangement sequences are adaptive, and no limitation is setup herein.

In the embodiment, when the data lines 30 input the first voltage data signal and the second voltage data signal to the subpixels, the subpixels input with the first voltage data signal and the subpixels input with the second voltage data signal should be arranged alternately. The voltage of the first voltage data signal is larger than the voltage of the second voltage data signal.

In the embodiment, in the direction of the column of the subpixel array 40, two adjacent pixel groups 41 in the same column adopt opposite polarity driving manners. Specifically, in two adjacent pixel groups 41 in the same column, the polarities of the data signals of the corresponding subpixels in the same column are contrary.

For instance, as shown in FIG. 6, in two adjacent pixel groups 41 in the same column, two red subpixels in the first pixel 411 are subpixels on corresponding positions in the same column, and the polarities of the data signals of the two red subpixels are opposite. Two blue subpixels in the second pixel 412 are subpixels on corresponding positions in the same column, and the polarities of the data signals of the two blue subpixels are opposite. And the condition of subpixels with other colors can be obtained accordingly.

In an embodiment, polarities of data signals of two subpixels in the same column in the pixel group 41 are the same, namely the polarities of data signals of two subpixels in the same column in the first pixel 411 and the second pixel 412 are the same. For instance, as shown in FIG. 6, in the pixel group 41, the red subpixel in the first pixel 411 and the blue subpixel in the second pixel 412 are two subpixels in the same column, and the polarities of the data signals both are positive.

In another embodiment, polarities of data signals of two subpixels in the same column in the pixel group 41 are different, namely the polarities of data signals of two subpixels in the same column in the first pixel 411 and the second pixel 412 are different. For instance, as shown in FIG. 7, FIG. 7 is a structural schematic view of a display panel in an embodiment. In the pixel group 41, the red subpixel in the first pixel 411 and the blue subpixel in the second pixel 412 are two subpixels in the same column. The polarity of the data signal of the red subpixel in the first pixel 411 is positive, and the polarity of the data signal of the blue subpixel in the second pixel 412 is negative. Or the polarity of the data signal of the red subpixel in the first pixel 411 is negative, and the polarity of the data signal of the blue subpixel in the second pixel 412 is positive.

In the embodiment, in the direction of the row of the subpixel array 40, the pixel groups 41 in the same row are driven by the first polarity driving manner and the second polarity driving manner. Specifically, the first polarity driving manner and the second polarity driving manner are two driving manners with contrary polarities.

For instance, as shown in FIG. 6, the first polarity driving manner can be arranged as follows. Polarities of the data signals of the subpixels in the first pixel 411 and the second pixel 412 in the pixel group 41 sequentially are positive, negative, negative and positive. The second polarity driving manner can be arranged as follows. Polarities of the data signals of the subpixels in the first pixel 411 and the second pixel 412 in the pixel group 41 sequentially are negative, positive, positive and negative. In other words, in the pixel groups 11 driven by the first polarity driving manner and the pixel groups 11 driven by the second polarity driving manner, polarities of the data signals of the subpixels at corresponding positions are opposite.

For instance, as shown in FIG. 7, the first polarity driving manner can be arranged as follows. Polarities of the data signals of the subpixels in the first pixel 411 in the pixel group 41 sequentially are positive, negative, negative and positive. Polarities of the data signals of the subpixels in the second pixel 412 sequentially are negative, positive, positive and negative. The second polarity driving manner can be arranged as follows. Polarities of the data signals of the subpixels in the first pixel 411 in the pixel group 41 sequentially are negative, positive, positive and negative. Polarities of the data signals of the subpixels in the second pixel 412 sequentially are positive, negative, negative and positive. In other words, in the pixel groups 11 driven by the first polarity driving manner and the pixel groups 11 driven by the second polarity driving manner, polarities of the data signals of the subpixels at corresponding positions are opposite.

In the embodiment, the pixel groups 41 are driven by the first polarity driving manner and the second polarity driving manner to guarantee the number of the subpixels input with the first voltage data signal with the positive polarity and the number of the subpixels input with the first voltage data signal with the negative polarity to be the same in the subpixels with the same color in the same row, and the number of the subpixels input with the second voltage data signal with the positive polarity and the number of the subpixels input with the second voltage data signal with the negative polarity to be the same in the subpixels with the same color in the same row. Comprehensively, in other embodiments, specific forms of the first polarity driving manner and the second polarity driving manner are not restricted to the situations above, and no limitation will be set herein.

In an embodiment, the pixel groups 41 driven by the first polarity driving manner and the pixel groups 41 driven by the second polarity driving manner in the direction of the row of the subpixel array 40 can be combined in various manners.

Figures 8, 9:
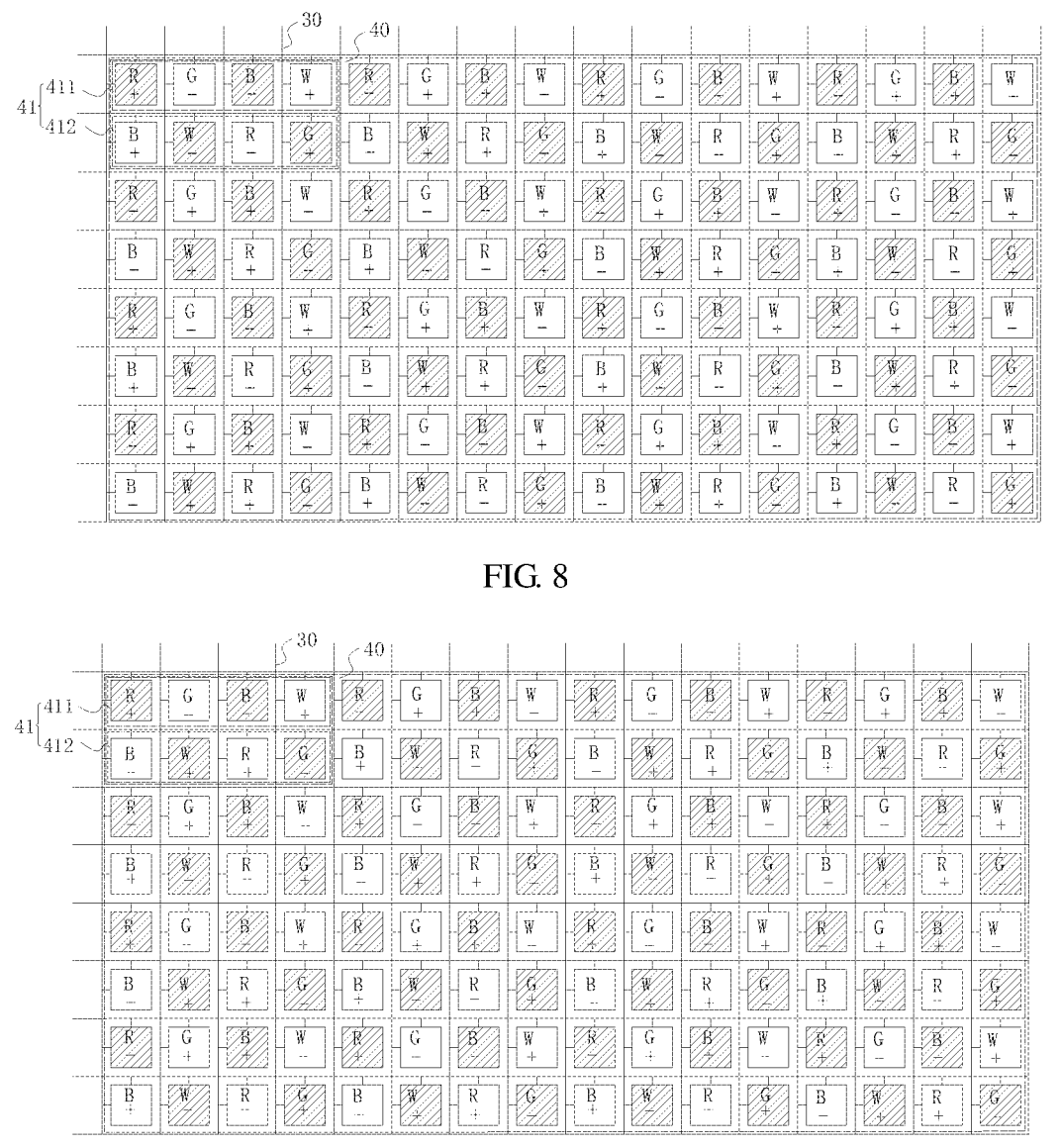
Figures 10, 11:
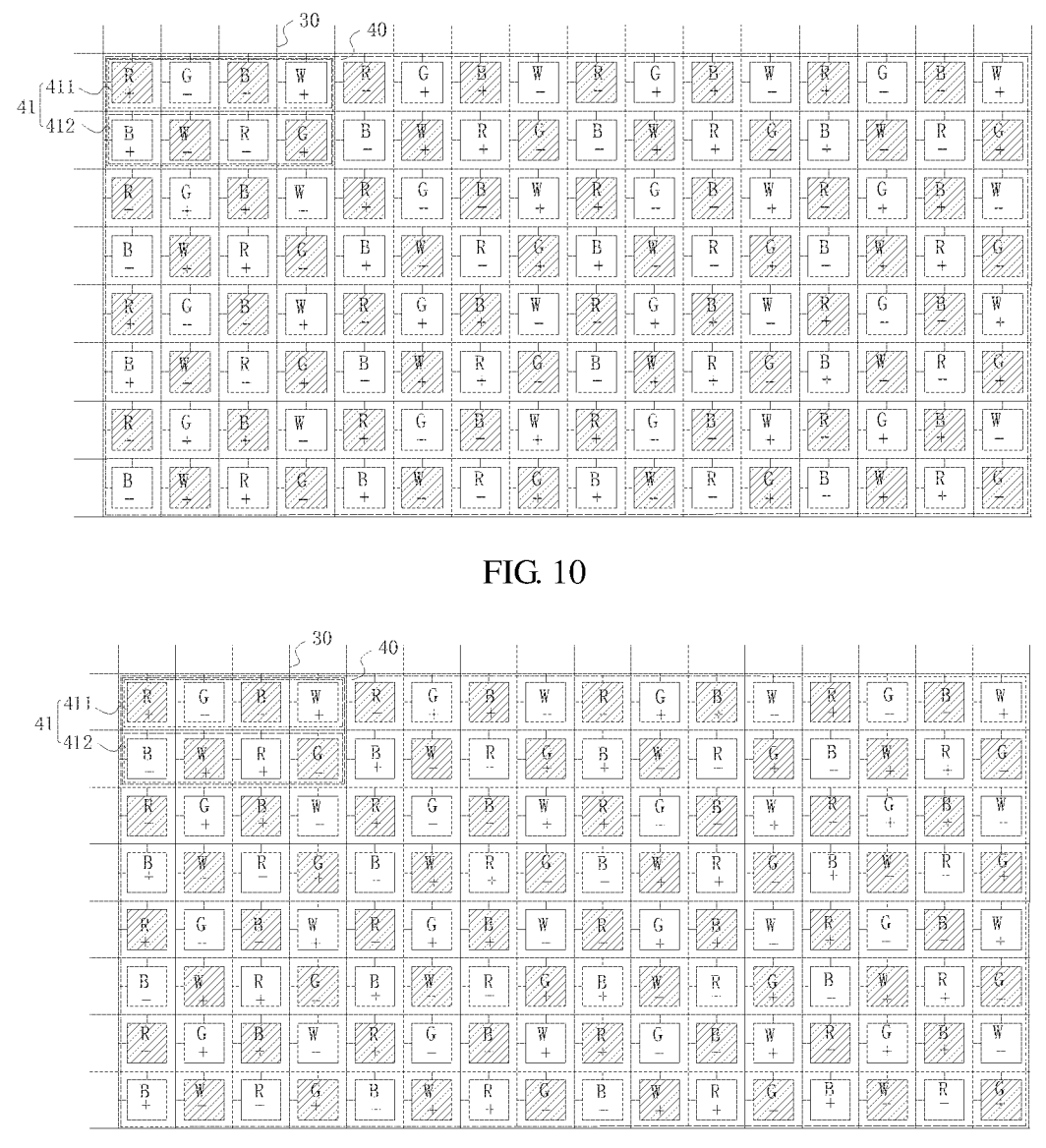

For instance, in FIG. 6 and FIG. 7, the pixel groups 41 in pair driven by the first polarity driving manner and the pixel groups 41 in pair driven by the second polarity driving manner are arranged alternately in the direction of the row. For example, as shown in FIG. 8 and FIG. 9, the pixel groups 41 driven by the first polarity driving manner and the pixel groups 41 driven by the second polarity driving manner are alternately arranged in the direction of the row. For instance, as shown in FIG. 10 and FIG. 11, in the direction of the row of the subpixel array 40, two pixel groups 41 driven by the second polarity driving manner are disposed between two adjacent pixel groups 41 driven by the first polarity driving manner, and the arrangement is repeated in the direction of the row to obtain the subpixel array 40 as shown in FIG. 10 and FIG. 11.

The arrangement and combination manners of the pixel groups 41 driven by the first polarity driving manner and the pixel groups 41 driven by the second polarity driving manner in the direction of the row of the subpixel array 40 are not limited in the manners as described above. Others can be adaptable without any limitation.

Furthermore, in other embodiments, the first pixel 411 and the second pixel 412 each can include three subpixels, respectively are a red subpixel, a green subpixel and a blue subpixel. For instance, as shown in FIG. 12 and FIG. 13, arrangement sequences of the subpixels in the first pixel 411 and the second pixel 412 are the same.

Figures 12, 13:
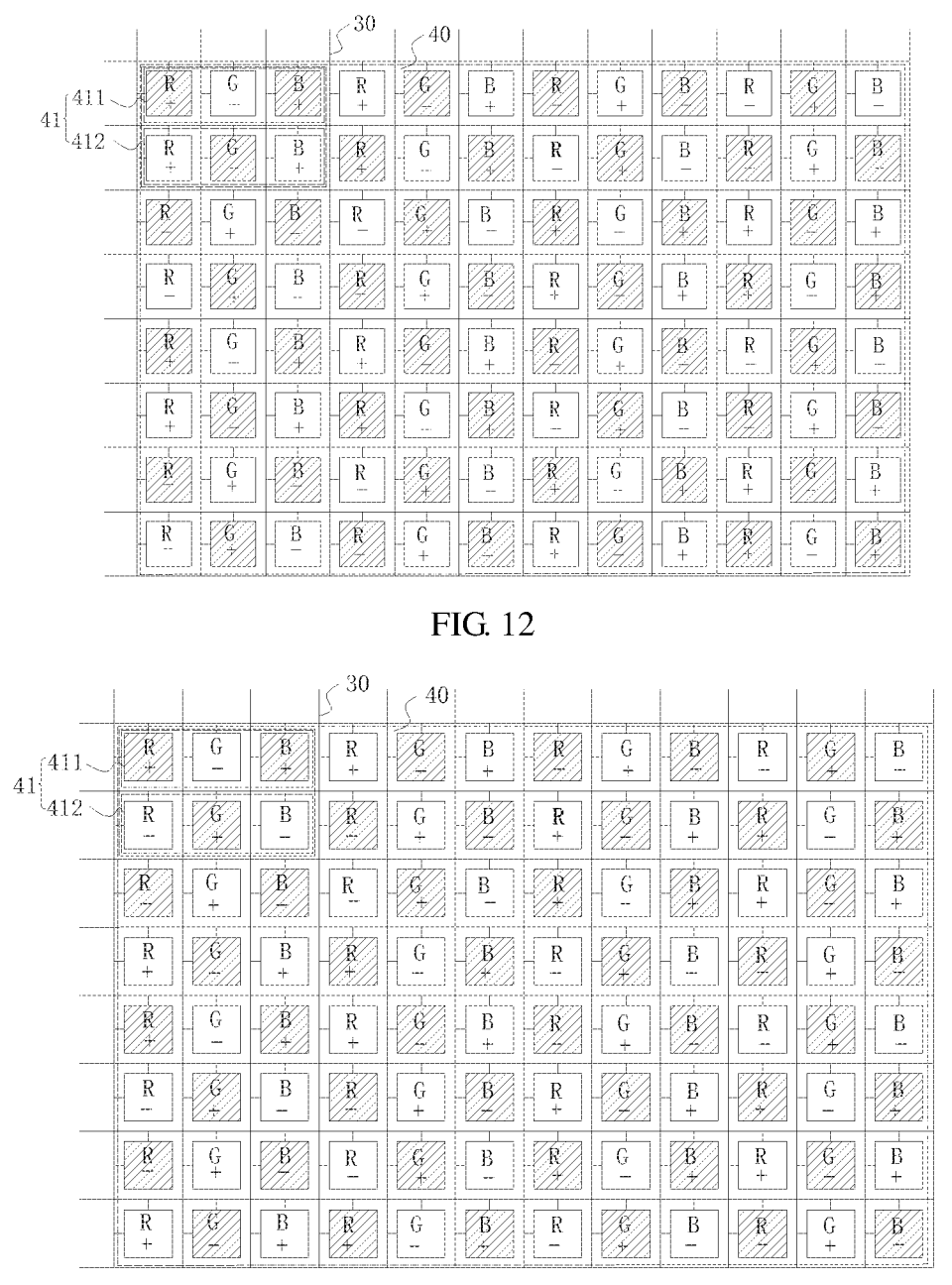

In the display panel shown in FIG. 12 and FIG. 13, when the data lines 30 input the first voltage data signal and the second voltage data signal to the subpixels, the subpixels input with the first voltage data signal and the subpixels input with the second voltage data signal should be arranged alternately; among the subpixels with the same color in the same row, the number of the subpixels input with the first voltage data signal with positive polarity and the number of the subpixels input with the first voltage data signal with negative polarity are the same; adjacent two pixel groups 41 in a same column adopt contrary polarity driving manners.

In the display panel as shown in FIG. 12, in one pixel group 41, the polarities of data signals of two subpixels in the same column in the first pixel 411 and the second pixel 412 are the same. For instance, the polarities of data signals of the subpixels in the first pixel 411 and the second pixel 412 each are positive, negative and positive, or the polarities of data signals of the subpixels in the first pixel 411 and the second pixel 412 each are negative, positive and negative.

In the display panel as shown in FIG. 13, in one pixel group 41, the polarities of data signals of two subpixels in the same column in the first pixel 411 and the second pixel 412 are different. For instance, in one pixel group 41, the polarities of data signals of the subpixels in the first pixel 411 each are positive, negative and positive, and the polarities of data signals of the subpixels in the second pixel 412 each are negative, positive and negative; or the polarities of data signals of the subpixels in the first pixel 411 each are negative, positive and negative, and the polarities of data signals of the subpixels in the second pixel 412 each are positive, negative and positive.

When the subpixel array 40 includes the subpixels with three colors, the pixel groups in the same row are driven by the first polarity driving manner and the second polarity driving manner.

Specifically, in FIG. 12, the first polarity driving manner can be arranged as follows. Polarities of the data signals of the subpixels in the first pixel 411 and the second pixel 412 in the pixel group 41 sequentially are positive, negative and positive. The second polarity driving manner can be arranged as follows. Polarities of the data signals of the subpixels in the first pixel 411 and the second pixel 412 in the pixel group 41 sequentially are negative, positive and negative.

Specifically, in FIG. 13, the first polarity driving manner can be arranged as follows. Polarities of the data signals of the subpixels in the first pixel 411 in the pixel group 41 sequentially are positive, negative and positive; polarities of the data signals of the subpixels in the second pixel 412 sequentially are negative, positive and negative. The second polarity driving manner can be arranged as follows. Polarities of the data signals of the subpixels in the first pixel 411 in the pixel group 41 sequentially are negative, positive and negative; polarities of the data signals of the subpixels in the second pixel 412 sequentially are positive, negative and positive.

In the display panels shown in FIG. 12 and FIG. 13, the pixel groups 41 in pair driven by the first polarity driving manner and the pixel groups 41 in pair driven by the second polarity driving manner are arranged alternately in the direction of the row of the subpixel array 40.

Comprehensively, in the embodiment of the first pixel 411 and the second pixel 412 both including three subpixels, in the direction of the row of the subpixel array 40, the arrangement and combination of the pixel groups 41 driven by the first polarity driving manner and pixel groups 41 driven by the second polarity driving manner are similar to the situation of the first pixel 411 and the second pixel 412 both including subpixels with four colors. And for the purpose of clarifying the disclosure, no repeat will be included herein.

The display panel in the embodiment can reduce color shift of the display panel at wide angles, as well as preventing incorrect colors due to the different amounts of the subpixels input with the first voltage data signal with the positive polarity and the subpixels input with the first voltage data signal with the negative polarity. The common electrode voltage is consequently free from the affection of the stray capacitance. The output image is upgraded and prevented from error occurrence.

Figure 14:
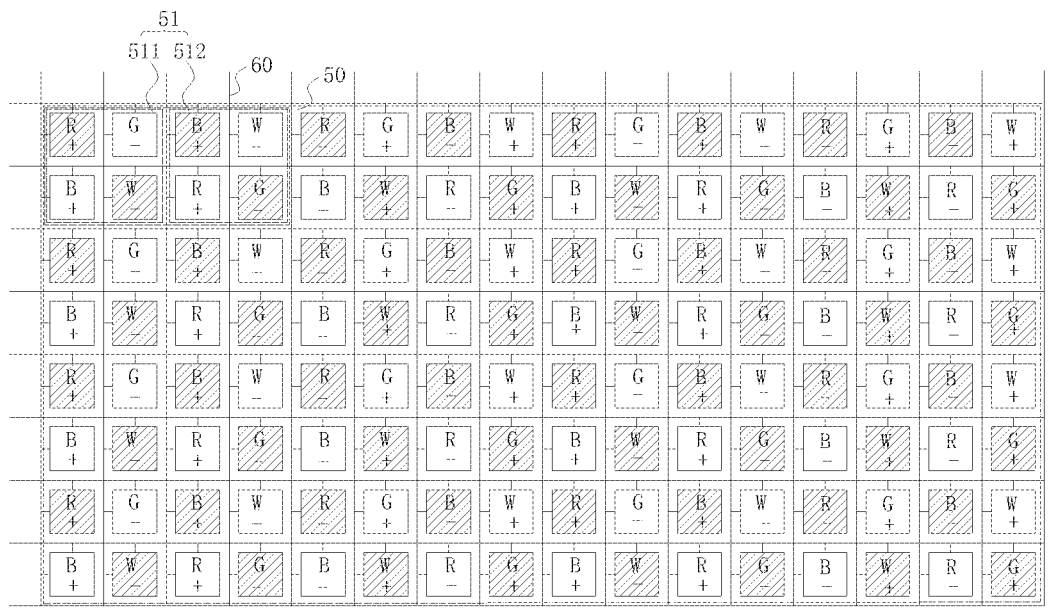
Figure 15:
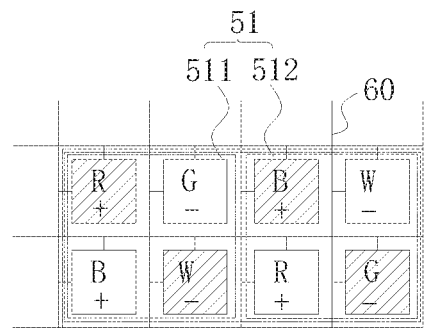
FIG. 15 is a structural schematic view of a pixel group in the display panel shown in FIG. 14.

Referring to FIG. 14 and FIG. 15, FIG. 14 is a structural schematic view of a display panel in an embodiment. FIG. 15 is a structural schematic view of pixel groups in the display panel shown in FIG. 14. The display panel includes a substrate, a subpixel array 50 and data lines 60. The substrate is formed with active switches. The subpixel array 50 is disposed on the substrate, including pixel groups 51. The data lines 60 and the active switches are coupled, configured to input data signals to the subpixels in the subpixel array 50 so as to fulfill the image display. The pixel group 51 includes a first pixel 511 and a second pixel 512 in the same row; the first pixel 511 and the second pixel 512 are proximate.

A person skilled in the art can understand the structure of the display panel shown in FIG. 14 is not the restriction of the display panel, in other embodiments, the display panel can further include other components such as scan lines, an array substrate line driving circuit, driving chips, and the specific structure of the display panel will not be limited herein.

The data lines 60 input the first voltage data signal and the second voltage data signal to the subpixels in the subpixel array 50 for fulfilling the image display. The voltage of the first voltage data signal is larger than the voltage of the second voltage data signal.

In the embodiment, when the data lines 60 input the data signal to the subpixels, the subpixels input with the first voltage data signal and the subpixels input with the second voltage data signal should be arranged alternately in the subpixel array 50.

In the embodiment, in order to prevent images shown by the display panel from phenomena such as color shift, when data lines 60 input data signals to the subpixels, among the subpixels with the same color in the same row, the number of the subpixels input with the first voltage data signal with positive polarity and the number of the subpixels input with the first voltage data signal with negative polarity should be the same.

Furthermore, in another embodiment, when the data lines 60 input data signals to the subpixels, among the subpixels with the same color in the same row, the number of the subpixels input with the second voltage data signal with positive polarity and the number of the subpixels input with the second voltage data signal with negative polarity should be the same.

In order to reduce heat generated by the driving chip of the display panel, in the embodiment, polarities of the data signals of the subpixels in the same column are the same. For instance, the polarities of the data signals of the subpixels in the same column either are positive polarities or negative polarities.

In the embodiment, the first pixel 511 and the second pixel 512 each include the red subpixel, the blue subpixel, the green subpixel and the white subpixel. The four subpixels in the first pixel 511 and the second pixel 512 are arranged in pair respectively at top and bottom to form a square.

In an embodiment, arrangement sequences of four subpixels in the first pixel 511 and four subpixels in the second pixel 512 are different. For instance, as shown in FIG. 14, in the first pixel 511, the red subpixel and the green subpixel are on top of the square, the blue subpixel and the white subpixel are at bottom of the square; in the second pixel 512, the blue subpixel and the white subpixel are on top of the square, the red subpixel and the green subpixel are at bottom of the square. Comprehensively, in other embodiments, arrangement manners of the subpixels in the first pixel 511 and the second pixel 512 can be other manners, and no limitation will be set herein.

In an embodiment, the polarities of the data signals of two adjacent subpixels in the same row in the first pixel 511 are opposite; the polarities of the data signals of two adjacent subpixels in the same row in the second pixel 512 are opposite.

For instance, as shown in FIG. 14, taking the first pixel group 51 in the first row as an example, the red subpixel and the green subpixel in the first pixel 511 are two adjacent subpixels in the same row. The polarity of the data signal of the red subpixel is a positive polarity, and the polarity of the data signal of the green subpixel is a negative polarity; equally, the blue subpixel and the white subpixel in the second pixel 512 are two adjacent subpixels in the same row. The polarity of the data signal of the blue subpixel is a positive polarity, and the polarity of the data signal of the white subpixel is a negative polarity.

Figures 16, 17:
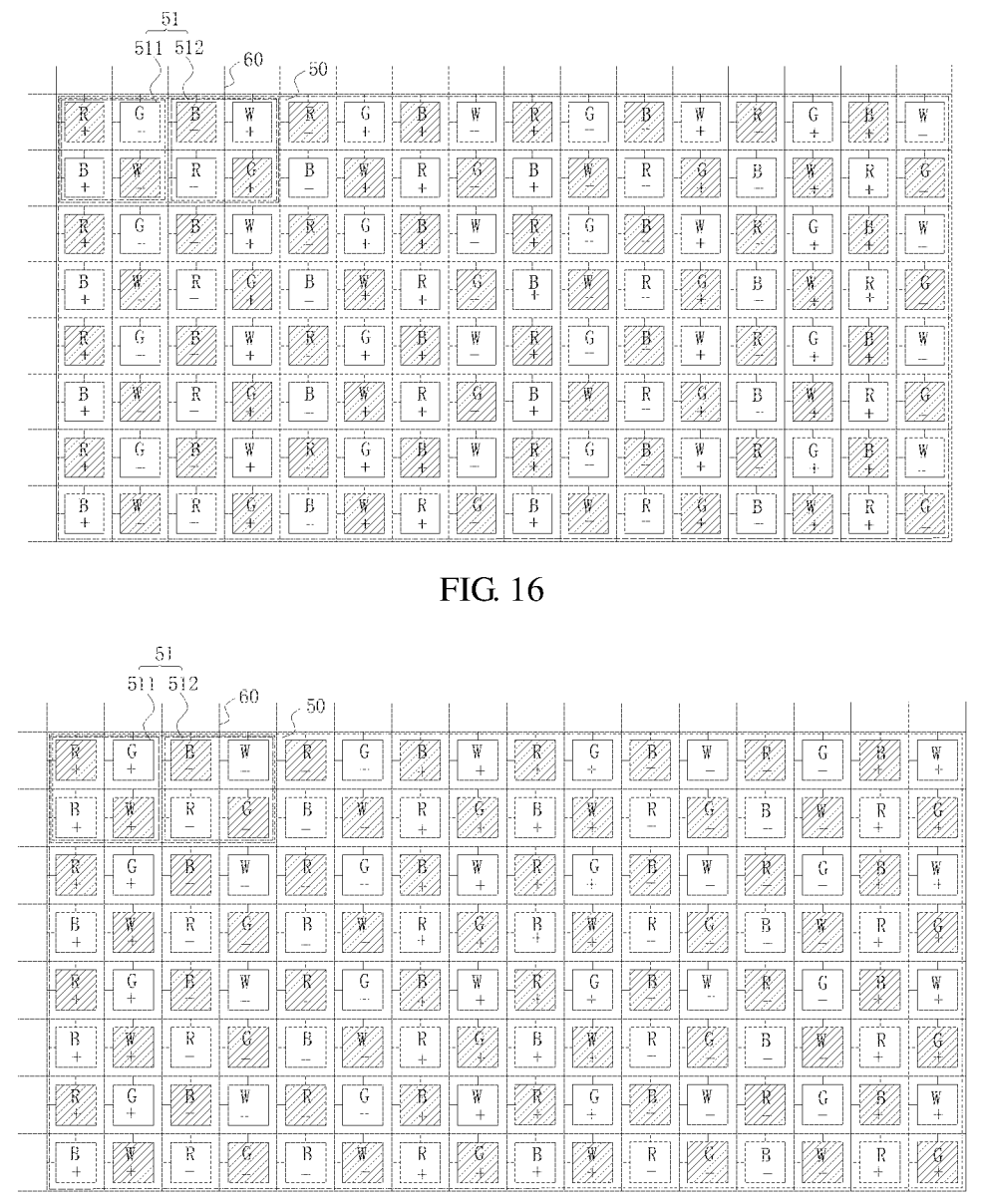

For example, as shown in FIG. 16, taking the first pixel group 51 in the first row as an example, the polarity of the data signal of the red subpixel in the first pixel 511 is positive, and the polarity of the data signal of the green subpixel is negative; equally, the polarity of the data signal of the blue subpixel in the second pixel 512 is a negative polarity, and the polarity of the data signal of the white subpixel is a positive polarity.

In another embodiment, polarities of data signals of four subpixels in the first pixel 511 are the same; polarities of data signals of four subpixels in the second pixel 512 are the same, and the polarities of the data signals of the subpixels in the first pixel 511 and the second pixel 512 are contrary.

For instance, as shown in FIG. 17, taking the first pixel group 51 in the first row as an example, the polarities of the data signals of the four subpixels in the first pixel 511 are positive polarities; the polarities of the data signals of the four subpixels in the second pixel 512 are negative polarities.

In an embodiment, the pixel groups 51 in the same row are driven by the first polarity driving manner and the second polarity driving manner. Specifically, the first polarity driving manner and the second polarity driving manner are two driving manner with opposite polarities.

For instance, as shown in FIG. 14, the first polarity driving manner can be arranged as follows. Polarities of the data signals of the subpixels in the first pixel 511 and the second pixel 512 in the pixel group 11 sequentially are positive, negative, positive and negative. The second polarity driving manner can be arranged as follows. Polarities of the data signals of the subpixels in the first pixel 511 and the second pixel 512 in the pixel group 51 sequentially are negative, positive, negative and positive.

For instance, as shown in FIG. 16, the first polarity driving manner can be arranged as follows. Polarities of the data signals of the subpixels in the first pixel 511 in the pixel group 51 sequentially are positive, negative, positive and negative; polarities of the data signals of the subpixels in the second pixel 512 in the pixel group 51 sequentially are negative, positive, negative and positive. And the second polarity driving manner can be arranged as follows. Polarities of the data signals of the subpixels in the first pixel 511 in the pixel group 51 sequentially are negative, positive, negative and positive; and polarities of the data signals of the subpixels in the second pixel 512 sequentially are positive, negative, positive and negative.

For example, as shown in FIG. 17, the first polarity driving manner can be as follows. Four subpixels in the first subpixel 511 in the pixel group 51 adopt the positive polarity, and four subpixels in the second subpixel 512 adopt the negative polarity. The second polarity driving manner can be as follows. Four subpixels in the first subpixel 511 in the pixel group 51 adopt the negative polarity, and four subpixels in the second subpixel 512 adopt the positive polarity.

In other words, in the pixel group 51 driven by the first polarity driving manner and the pixel groups 51 driven by the second polarity driving manner, the polarities of the data signals of the subpixels at corresponding positions are opposite.

In the embodiment, the pixel groups 51 driven by the first polarity driving manner and the pixel groups 51 driven by the second polarity driving manner are alternately arranged in the direction of the row of the subpixel array 50. Specifically, one pixel group 51 driven by the second polarity driving manner is disposed between two adjacent pixel groups 51 driven by the first polarity driving manner in the same row, and one pixel group 51 driven by the first polarity driving manner is disposed between two adjacent pixel groups 51 driven by the second polarity driving manner in the same row.

Comprehensively, the pixel groups 51 driven by the first polarity driving manner and the pixel groups 51 driven by the second polarity driving manner can be combined in other manners along the direction of the row of the subpixel array 50, but the manners will not be each listed.

The display panel in the embodiment can reduce color shift of the display panel at wide angles, as well as preventing incorrect colors due to the different amounts of the subpixels input with the first voltage data signal with the positive polarity and the subpixels input with the first voltage data signal with the negative polarity. The common electrode voltage is consequently free from the affection of the stray capacitance. The output image is upgraded and prevented from error occurrence.

Figures 18, 19:
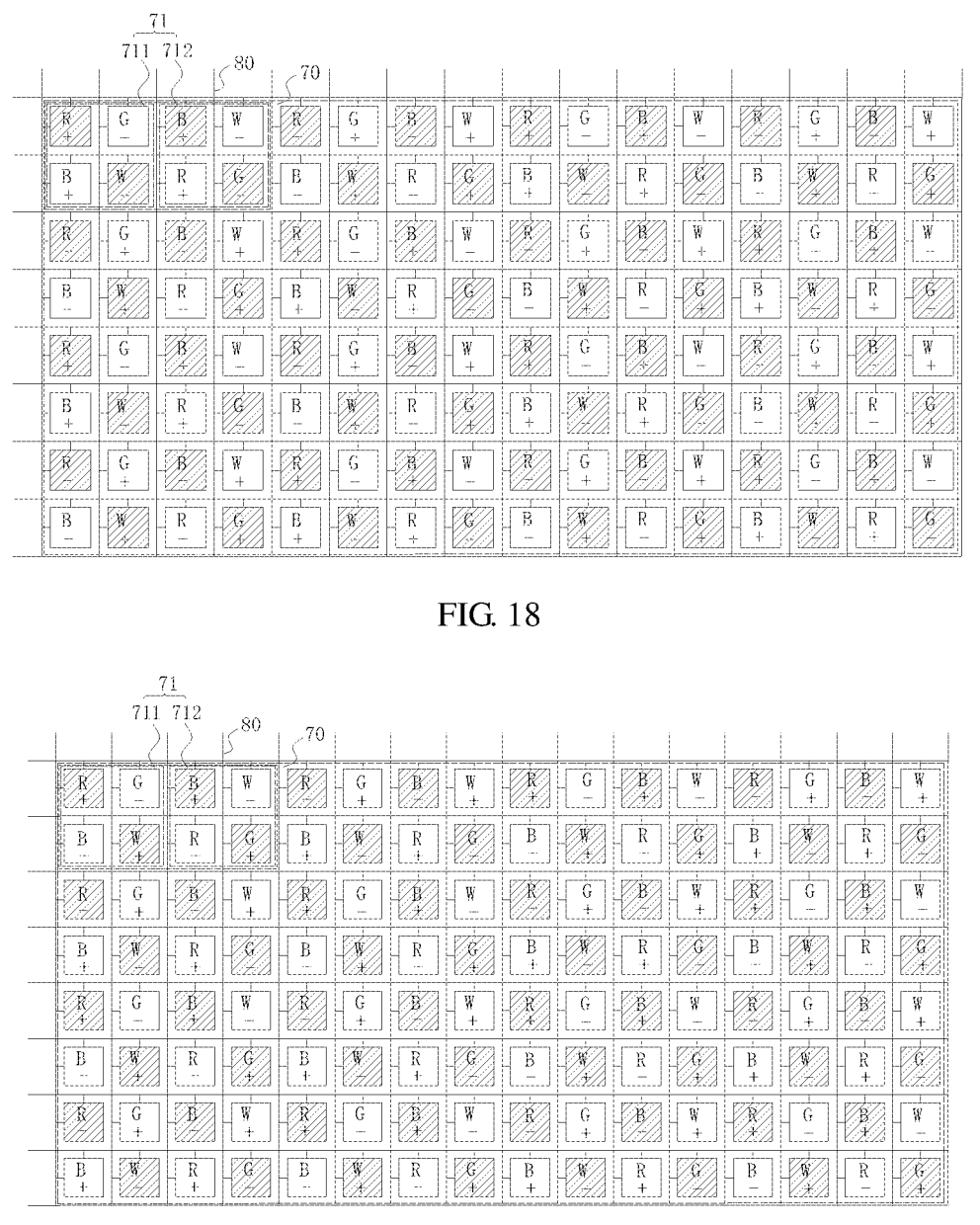

Referring to FIG. 18, FIG. 18 is a structural schematic view of a display panel in an embodiment. The display panel includes a substrate, a subpixel array 70 and data lines 80. The substrate is formed with active switches. The subpixel array 70 is disposed on the substrate, including pixel groups 71. The data lines 80 and the active switches are coupled, configured to input data signals to the subpixels in the subpixel array 70 so as to fulfill the image display.

The data lines 80 input the first voltage data signal and the second voltage data signal to the subpixels in the subpixel array 70 for fulfilling the image display. The voltage of the first voltage data signal is larger than the voltage of the second voltage data signal.

In the embodiment, when the data lines 80 input the data signal to the subpixels, the subpixels input with the first voltage data signal and the subpixels input with the second voltage data signal should be arranged alternately in the subpixel array 70.

In the embodiment, in order to prevent images shown by the display panel from phenomena such as color shift, when the data lines 80 input data signals to the subpixels, among the subpixels with the same color in the same row, the number of the subpixels input with the first voltage data signal with positive polarity and the number of the subpixels input with the first voltage data signal with negative polarity should be the same.

Furthermore, in another embodiment, when the data lines 80 input data signals to the subpixels, among the subpixels with the same color in the same row, the number of the subpixels input with the second voltage data signal with positive polarity and the number of the subpixels input with the second voltage data signal with negative polarity should be the same.

In the embodiment, the pixel group 71 includes a first pixel 711 and a second pixel 712 in the same row. The first pixel 711 and the second pixel 712 are adjacent. The first pixel 711 and the second pixel 712 each include four subpixels, respectively are the red subpixel, the blue subpixel, the green subpixel and the white subpixel. The four subpixels in the first pixel 711 and the four subpixels in the second pixel 712 are arranged in pair respectively at top and bottom.

In an embodiment, arrangement sequences of four subpixels in the first pixel 711 and four subpixels in the second pixel 712 are different. For instance, as shown in FIG. 18, in the first pixel 711, the red subpixel and the green subpixel are on top, the blue subpixel and the white subpixel are at bottom; in the second pixel 712, the blue subpixel and the white subpixel are on top, the red subpixel and the green subpixel are at bottom. Comprehensively, in other embodiments, arrangement manners of the subpixels in the first pixel 711 and the second pixel 712 can be other manners, and no limitation will be set herein.

In the embodiment, the arrangement manners of the subpixels in the pixels in the same column are identical. For instance, as shown in FIG. 18, in the subpixel array 70, pixels in the first column adopt the same manner to arrange subpixels as the first pixel 711; pixels in the second column adopt the same manner to arrange subpixels as the second pixel 712.

In the embodiment, when the data lines 80 input data signals to the subpixels, two adjacent pixel groups 71 in the same column adopt opposite polarity driving manner. Specifically, in two adjacent pixel groups 71 in the same column, polarities of the data signals of the subpixels at corresponding positions in the same column are opposite. For instance, as shown in FIG. 18, in two adjacent pixel groups 71 in the same column, two red subpixels in the first pixel 711 are subpixels on corresponding positions in the same column, and the polarities of the data signals of the two red subpixels are opposite. Two blue subpixels in the second pixel 712 are subpixels on corresponding positions in the same column, and the polarities of the data signals of the two blue subpixels are opposite. And the condition of subpixels with other colors can be obtained accordingly.

In an embodiment, the polarities of data signals of two adjacent subpixels in the same row in the first pixel 711 are opposite; the polarities of data signals of two adjacent subpixels in the same row in the second pixel 712 are opposite. For instance, as shown in FIG. 18, the red subpixel and the green subpixel in the first pixel 711 are two adjacent subpixels in the same row, and the polarities of the data signals thereof can respectively be a positive polarity and a negative polarity, or a negative polarity and a positive polarity. As another example, the blue subpixel and the white subpixel in the second pixel 712 are two adjacent subpixels in the same row, and the polarities of the data signals thereof can respectively be a positive polarity and a negative polarity, or a negative polarity and a positive polarity.

Furthermore, in an embodiment, the polarities of data signals of two adjacent subpixels in the same column in the first pixel 711 are the same; the polarities of data signals of two adjacent subpixels in the same column in the second pixel 712 are the same. For instance, as shown in FIG. 18, the red subpixel and the blue subpixel in the first pixel 711 are two adjacent subpixels in the same column, and the polarities of the data signals thereof can both be positive polarities, or both be negative polarities. As another example, the white subpixel and the green subpixel in the second pixel 712 are two adjacent subpixels in the same column, and the polarities of the data signals thereof can both be negative polarities, or both be positive polarities.

Furthermore, in another embodiment, the polarities of data signals of two adjacent subpixels in the same column in the first pixel 711 are opposite; the polarities of data signals of two adjacent subpixels in the same column in the second pixel 712 are opposite. For instance, as shown in FIG. 19, and the polarities of the data signals of the red subpixel and the blue subpixel in the first pixel 711 can respectively be the positive polarity and the negative polarity, or can be the negative polarity and the positive polarity. As another example, the polarities of the data signals of the white subpixel and the green subpixel in the second pixel 712 can respectively be the negative polarity and the positive polarity, or can be the positive polarity and the negative polarity.

In an embodiment, in the same pixel group 71, polarities of data signals of subpixels at the boundary of the first pixel 711 and the second pixel 712 are opposite. For instance, as shown in FIG. 18 and FIG. 19, the green subpixel in the first pixel 711 and the blue subpixel in the second pixel 712 are subpixels located symmetrically with respective to the boundary in the same row, and the polarities of the data signals thereof respectively are the negative polarity and the positive polarity, or respectively are the positive polarity and the negative polarity. As another example, in FIG. 19, the white subpixel in the first pixel 711 and the red subpixel in the second pixel 712 are subpixels located symmetrically with respective to the boundary in the same row, and the polarities of the data signals thereof respectively are the positive polarity and the negative polarity, or respectively are the negative polarity and the positive polarity.

Figures 20, 21:
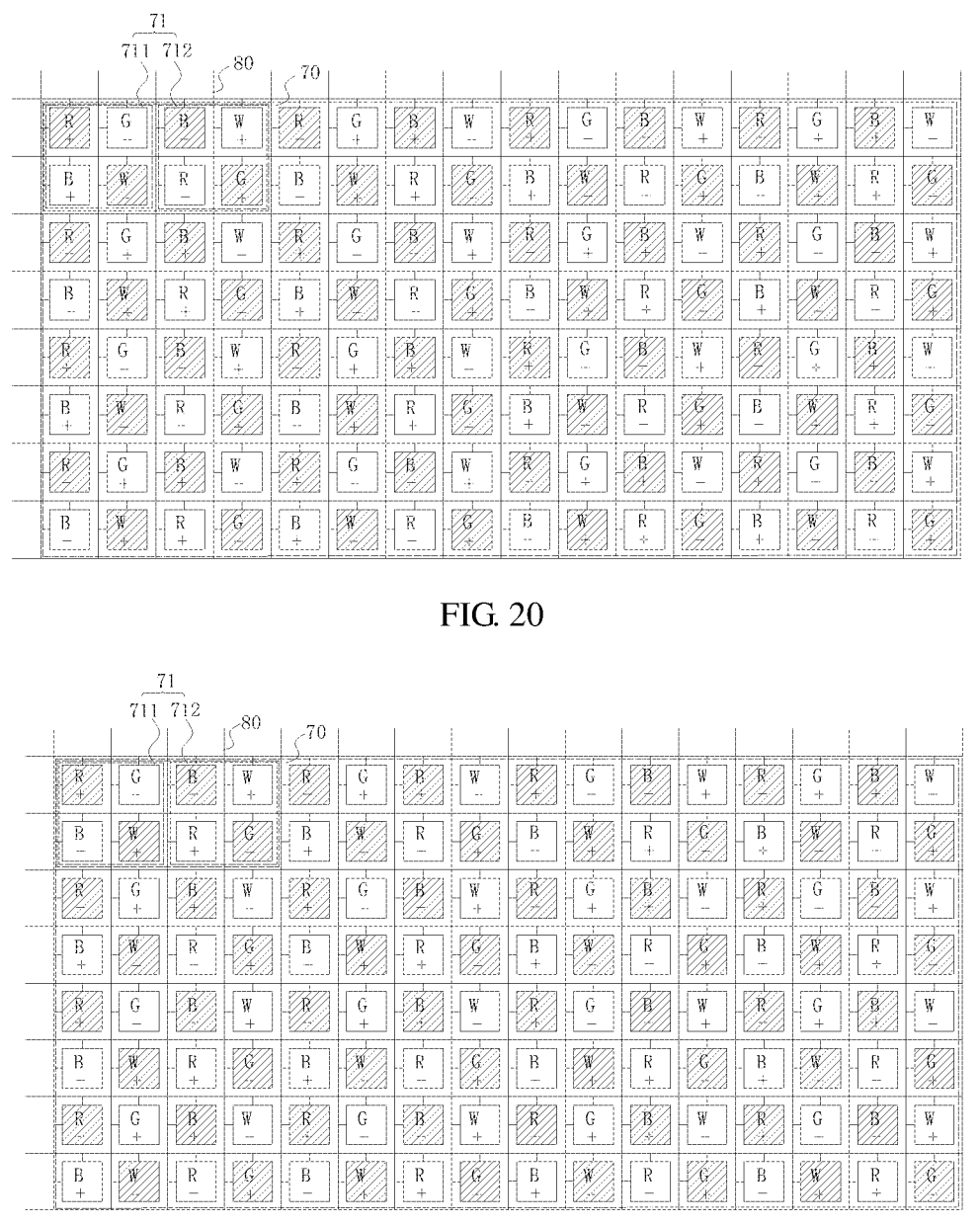

In another embodiment, in the same pixel group 71, polarities of data signals of subpixels at the boundary of the first pixel 711 and the second pixel 712 are the same. For instance, as shown in FIG. 20, the green subpixel in the first pixel 711 and the blue subpixel in the second pixel 712 are subpixels located symmetrically with respective to the boundary in the same row, and the polarities of the data signals thereof both are the negative polarity or the positive polarity. As another example, in FIG. 21, the green subpixel in the first pixel 711 and the blue subpixel in the second pixel 712 are subpixels located symmetrically with respective to the boundary in the same row, and the polarities of the data signals thereof both are the negative polarity and the positive polarity.

In an embodiment, the polarities of data signals of four subpixels in the first pixel 711 can be the same, and the polarities of data signals of four subpixels in the second pixel 712 can further be the same. And the polarities of the data signals of the subpixels in the first pixel 711 and the second pixel 712 are opposite.

Figure 22:
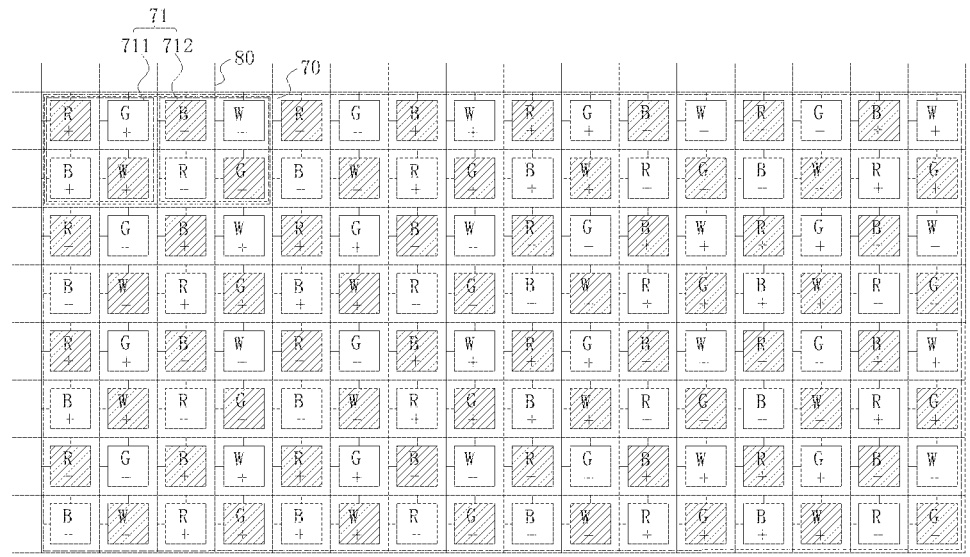

For instance, as shown in FIG. 22, the polarities of data signals of four subpixels in the first pixel 711 are positive polarities; the polarities of data signals of four subpixels in the second pixel 712 are negative polarities. Or the polarities of data signals of four subpixels in the first pixel 711 are negative polarities; the polarities of data signals of four subpixels in the second pixel 712 are positive polarities.

In another embodiment, polarities of data signals of two adjacent subpixels in the same row in the first pixel 711 are the same; polarities of data signals of two adjacent subpixels in the same column are opposite; polarities of data signals of two adjacent subpixels in the same row in the second pixel 712 are the same; polarities of data signals of two adjacent subpixels in the same column are opposite.

Figure 23:
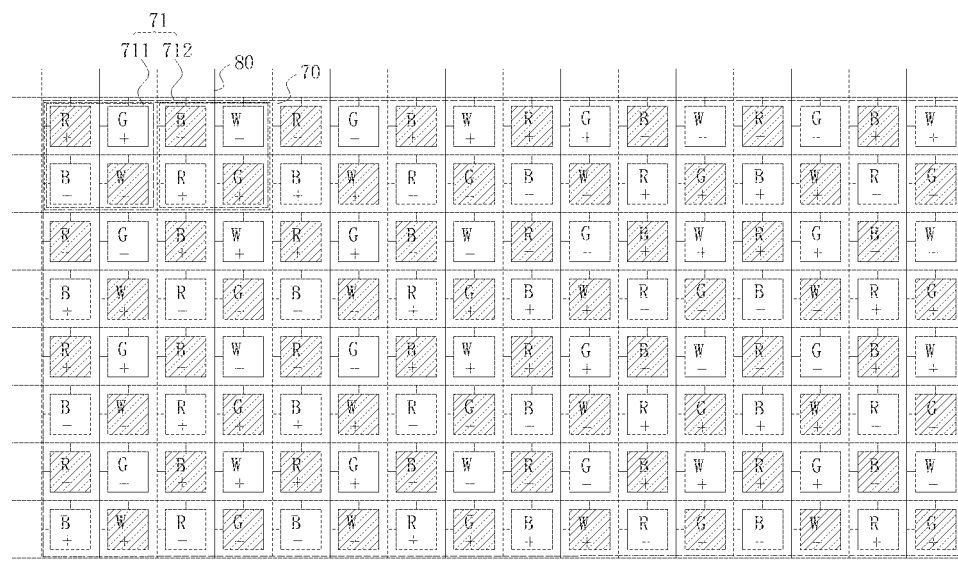

For instance, as shown in FIG. 23, the polarities of data signals of the red subpixel and the green subpixel in the first pixel 711 both are positive polarities, and the polarities of data signals of the blue subpixel and the white subpixel both are negative polarities. Or the polarities of data signals of the red subpixel and the green subpixel in the first pixel 711 both are negative polarities; the polarities of data signals of the blue subpixel and the white subpixel both are positive polarities.

In an embodiment, the pixel groups 71 in the same row are driven by the first polarity driving manner and the second polarity driving manner. Specifically, in the direction of the row of the subpixel array 70, in the pixel group 71 driven by the first polarity driving manner and the pixel group 71 driven by the second polarity driving manner, polarities of data signals of the subpixels at corresponding positions are opposite.

For instance, as shown in FIG. 18, for the sake of descriptive purposes, the pixel group 71 driven by the first polarity driving manner is named the first pixel group, and the pixel group 71 driven by the second polarity driving manner is named the second pixel group. In the direction of the row of the subpixel array 70, the red subpixel in the first pixel 711 in the first pixel group and the red subpixel in the first subpixel 711 in the second pixel group are subpixels at corresponding positions. The blue subpixel in the second pixel 712 in the first pixel group and the blue subpixel in the second subpixel 712 in the second pixel group are subpixels at corresponding positions. Comprehensively, other subpixels at corresponding positions can easily be determined according to the rule above, and no detailed description is provided here.

In FIG. 18, in the first pixel group and the second pixel group, polarities of data signals of two red subpixels in two first pixels 711 respectively are the positive polarity and the negative polarity. Polarities of data signals of two blue subpixels in two second pixels 712 respectively are the positive polarity and the negative polarity.

In an embodiment, in the direction of the row of the subpixel array 70, the pixel groups 71 driven by the first polarity driving manner and the pixel groups 71 driven by the second polarity driving manner are alternately arranged. Specifically, one pixel group 71 driven by the second polarity driving manner is disposed between two adjacent pixel groups 71 driven by the first polarity driving manner in the same row; one pixel group 71 driven by the first polarity driving manner is disposed between two adjacent pixel groups 71 driven by the second polarity driving manner in the same row.

Comprehensively, the pixel groups 71 driven by the first polarity driving manner and the pixel groups 71 driven by the second polarity driving manner can include other manners in combination along the direction of the row of the subpixel array 70, but the manners will not be each listed.

The display panel in the embodiment can reduce color shift of the display panel at wide angles, as well as preventing incorrect colors due to the different amounts of the subpixels input with the first voltage data signal with the positive polarity and the subpixels input with the first voltage data signal with the negative polarity. The common electrode voltage is consequently free from the affection of the stray capacitance. The output image is upgraded and prevented from error occurrence.

The display panel includes a substrate, a subpixel array and data lines. The substrate is formed with active switches. The subpixel array is disposed on the substrate. The subpixel array includes pixels. The pixel includes subpixels. The data lines and the active switches are coupled. The display panel further includes scan lines. The data lines in coordination with the scan lines input data signals to the subpixels so as to fulfill the image display.

Specifically, in the embodiment, data lines input the first voltage data signal and the second voltage data signal to the subpixels in the subpixel array. The voltage of the first voltage data signal is larger than the voltage of the second voltage data signal. The first voltage data signal specifically can be a high voltage data signal, and the second voltage data signal can be a low voltage data signal.

The data lines inputting the first voltage data signal and the second voltage data signal to the subpixels in the subpixel array specifically is dividing an original data signal of an image to be displayed into a first voltage data signal and a second voltage data signal in space, namely the original data signal is divided into the high voltage data signal and the low voltage data signal in space.

In order to solve the problem of color shift of large-sized display panel at wide angles, in the embodiment, in the pixels of the display panel, arrangement manners of the subpixels in the pixel in the same column in the pixel array of the display panel are the same. The data lines are configured to input the first voltage data signal and the second voltage data signal to the subpixels in the pixels. The driving manner to input voltages specifically is among the subpixels in the same row, the subpixels input with the first voltage data signal and the subpixels input with the second voltage data signal are alternately arranged; two subpixels in the same column of one pixel respectively are input with the first voltage data signal and the second voltage data signal; among two adjacent pixels in the same column, subpixels with the same color respectively are input with the first voltage data signal and the second voltage data signal; among the subpixels with the same color in the same row, the number of the subpixels input with the first voltage data signal with positive polarities and the number of the subpixels input with the first voltage data signal with negative polarities are equal.

In the embodiment, specific arrangement manners of the alternate arrangement include: one subpixel input with the second voltage data signal disposed between two adjacent subpixels input with the first voltage data signal in the same row, and one subpixel input with the first voltage data signal disposed between two adjacent subpixels input with the second voltage data signal in the same row.

Apparently, in other embodiments, the specific manners of the alternate arrangement of the subpixels input with the first voltage data signal and the subpixels input with the second voltage data signal can further be other manners, and no more limitation will be defined herein.

Furthermore, in an embodiment, among the subpixels with the same color in the same row, the number of the subpixels input with the second voltage data signal with positive polarities and the number of subpixels input with the second voltage data signal with negative polarities are likewise the same.

In the display panel of the embodiment, the subpixels input with the first voltage data signal and the subpixels input with the second voltage data signal are arranged alternately in the same row, and among the subpixels with the same color in the same row, the number of the subpixels input with the first voltage data signal with the positive polarity and the number of the subpixels input with the first voltage data signal with the negative polarity are identical to reduce color shift of the display panel at wide angles and simultaneously prevent color washout due to the different amounts of the subpixels input with the first voltage data signal with the positive polarity and the subpixels input with the first voltage data signal with the negative polarity. The output image is upgraded and prevented from error occurrence.

The specific structure of the display panel such as types of colors of the subpixels, arrangement manners, and polarity arrangement manners of data signals of the embodiment can further be designed according to practical requirements in production and application. Concrete structures of the display panel will be illustrated in detail with reference to FIG. 24 through FIG. 34 as follows. In the display panel shown in FIG. 24 through FIG. 30, polarity driving manners of two adjacent pixels in the same column are opposite; in the display panel shown in FIG. 31 through FIG. 34, polarity driving manners of two adjacent pixels in the same column are the same.

Figure 24:
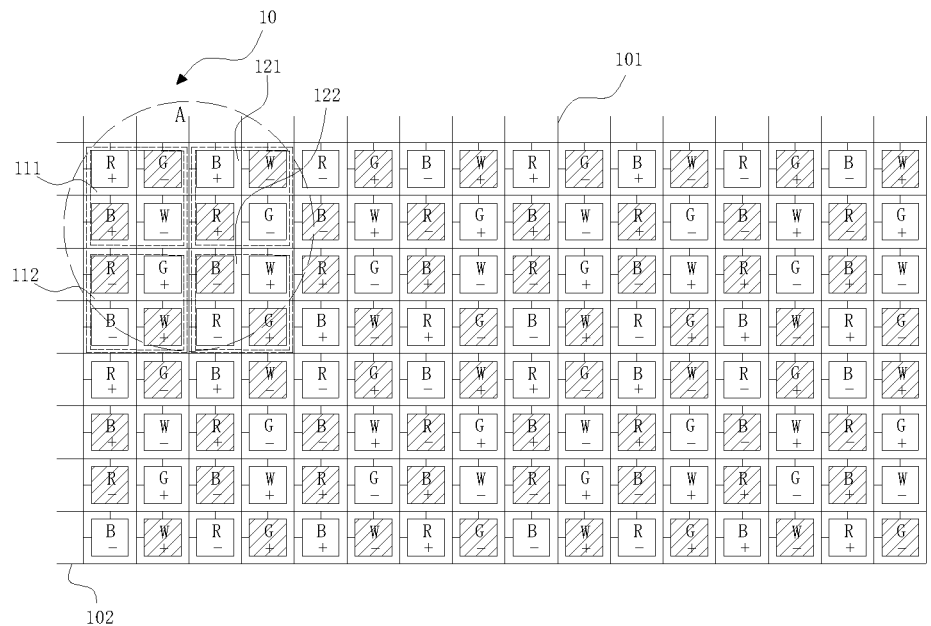
FIG. 24 is a structural schematic view of a display panel according to an embodiment of the disclosure.
Figure 25:
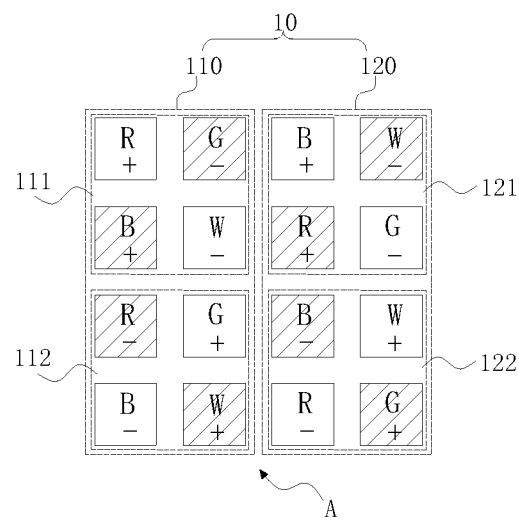
FIG. 25 is an enlarged schematic view of A in FIG. 24.

Referring to FIG. 24 and FIG. 25, the display panel shown in FIG. 24 includes a substrate, a subpixel array 10, data lines 101 and scan lines 102. The subpixels (red subpixels R, green subpixels G, blue subpixels B and white subpixels W in the figure) in the subpixel array 10 are connected to the data lines 101 and the scan lines 102.

As shown in FIG. 25, the pixels include first pixels 111, second pixels 112, third pixels 121 and fourth pixels 122. The first pixel 111 and the second pixel 112 are in the same column to form a first pixel group 110; the third pixel 121 and the fourth pixel 122 are in the same column to form a second pixel group 120. The first pixel group 110 and the second pixel group 120 are arranged along the direction of the row of the subpixel array. The arrangement manners of the subpixels in the first pixel group 110 and the second pixel group 120 are different, to be specific, the arrangement manner of the subpixels in the first pixel 111 and the second pixel 112 is different from the arrangement manner of the subpixels in the third pixel 121 and the fourth pixel 122.

In some embodiments, the arrangement manners of the subpixels in the first pixel 111 and the second pixel 112 are the same; the arrangement manners of the subpixels in the third pixel 121 and the fourth pixel 122 are the same.

In the embodiment, the first pixel 111, the second pixel 112, the third pixel 121 and the fourth pixel 122 each include four subpixels, respectively are the red subpixel R, the green subpixel G, the blue subpixel B and the white subpixel W. The four subpixels are arranged in pair at top and bottom.

In the embodiment, as shown in FIG. 25, the red subpixel and the green subpixel are a pair, namely an RG couple; the blue subpixel and the white subpixel are a pair, namely a BW couple. In the first pixel group 110, the RG couple is on the top, the BW couple is at the bottom. In the second pixel group 120, the BW couple is on the top, and the RG couple is at the bottom. In other embodiments, the subpixels can be arranged in other manners without any limitation.

In the embodiment, the first pixel group 110 and the second pixel group 120 form the pixel group 10. The pixel groups 10 are arranged to form the subpixel array.

In the embodiment, the pixel groups 10 in the same row are driven by the first polarity driving manner and the second polarity driving manner. To be specific, the first polarity driving manner and the second polarity driving manner drive alternately. The first polarity driving manner and the second polarity driving manner are opposite polarity driving manners, in other embodiments, the first polarity driving manner and the second polarity driving manner can be other driving manners without any limitation.

For instance, in FIG. 24, in the pixel groups 10 driven by the first polarity driving manner, polarities of the red subpixel, the green subpixel, the blue subpixels and the white subpixels in the first pixel 111 respectively are positive, negative, positive and negative; polarities of the red subpixels, the green subpixels, the blue subpixel and the white subpixel in the second pixel 112 respectively are negative, positive, negative and positive; polarities of the red subpixel, the green subpixel, the blue subpixels and the white subpixels in the third pixel 121 respectively are positive, negative, positive and negative; polarities of the red subpixels, the green subpixels, the blue subpixel and the white subpixel in the fourth pixel 122 respectively are negative, positive, negative and positive.

In the pixel group 10 driven by the second polarity driving manner, polarities of the red subpixel, the green subpixel, the blue subpixel and the white subpixel in the first pixel 111 respectively are negative, positive, negative and positive; polarities of the red subpixels, the green subpixels, the blue subpixel and the white subpixel in the second pixel 112 respectively are positive, negative, positive and negative; polarities of the red subpixel, the green subpixel, the blue subpixel and the white subpixel in the third pixel 121 respectively are negative, positive, negative and positive; polarities of the red subpixels, the green subpixels, the blue subpixel and the white subpixel in the fourth pixel 122 respectively are positive, negative, positive and negative.

In the pixel group 10 driven by the first polarity driving manner and the pixel group 10 driven by the second polarity driving manner, the polarities of data signals of subpixels at corresponding positions are opposite. In the direction of the row of the subpixel array, the pixel groups in the same row are alternately driven by the first polarity driving manner and the second polarity driving manner to better uniform the positive negative polarity driving of subpixels of the entire display panel, reduce positive-negative polarity shift on large area and prevent from generating the flicker in visual.

Comprehensively, in other embodiments, specific forms of the first polarity driving manner and the second polarity driving manner are not restricted to the polarity arrangement manners shown in FIG. 24, and other manners are adaptable, such as the manners shown in FIG. 26 through FIG. 30.

In some embodiments, in the first pixel 111, the second pixel 112, the third pixel 121 and the fourth pixel 122, the polarities of the data signals of the four subpixels in each of the pixels satisfy the polarities of the data signals of two adjacent subpixels in the same column are the same, and the polarities of the data signals of two adjacent subpixels in the same row are opposite.

Figure 26:
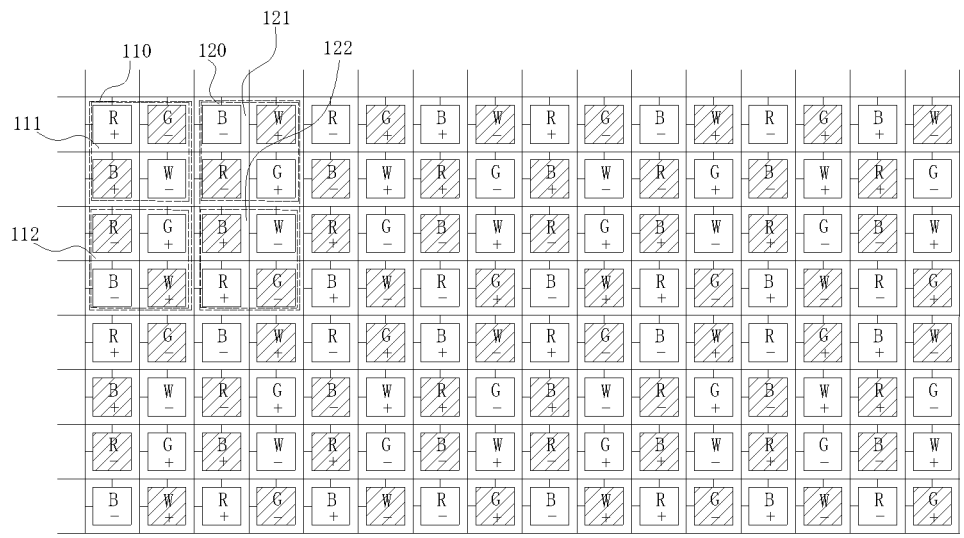
FIG. 26 through FIG. 30 each are other structural schematic views of display panels according to embodiments of the disclosure.

For instance, as shown in FIG. 26, in the first pixel 111, the second pixel 112, the third pixel 121 and the fourth pixel 122, the red subpixel and the green subpixel are two adjacent subpixels in the same row; the blue subpixel and the white subpixel are two adjacent subpixels in the same row. Polarities of the red subpixel, the green subpixel, the blue subpixel and the white subpixel in the first pixel 111 respectively are positive, negative, positive and negative; polarities of the red subpixel, the green subpixel, the blue subpixel and the white subpixel in the second pixel 112 respectively are negative, positive, negative and positive; polarities of the blue subpixel, the white subpixel, the red subpixel and the green subpixel in the third pixel 121 respectively are negative, positive, negative and positive; polarities of the blue subpixel, the white subpixel, the red subpixel and the green subpixel in the fourth pixel 122 respectively are positive, negative, positive and negative. The polarities of the red subpixel, the green subpixel, the blue subpixel and the white subpixel of the first pixel can respectively be negative, positive, negative and positive as well. The polarities of the second pixel 112, the third pixel 121 and the fourth pixel 122 can be contrary forms without any limitation herein.

In some embodiments, in the first pixel 111, the second pixel 112, the third pixel 121 and the fourth pixel 122, the polarities of the data signals of the four subpixels in each of the pixels satisfy the polarities of the data signals of two adjacent subpixels in the same row are the same, and the polarities of the data signals of two adjacent subpixels in the same column are opposite. The polarities of the data signals of the subpixels in the same row in the first pixel 111 and the third pixel 121 are opposite.

Figure 27:
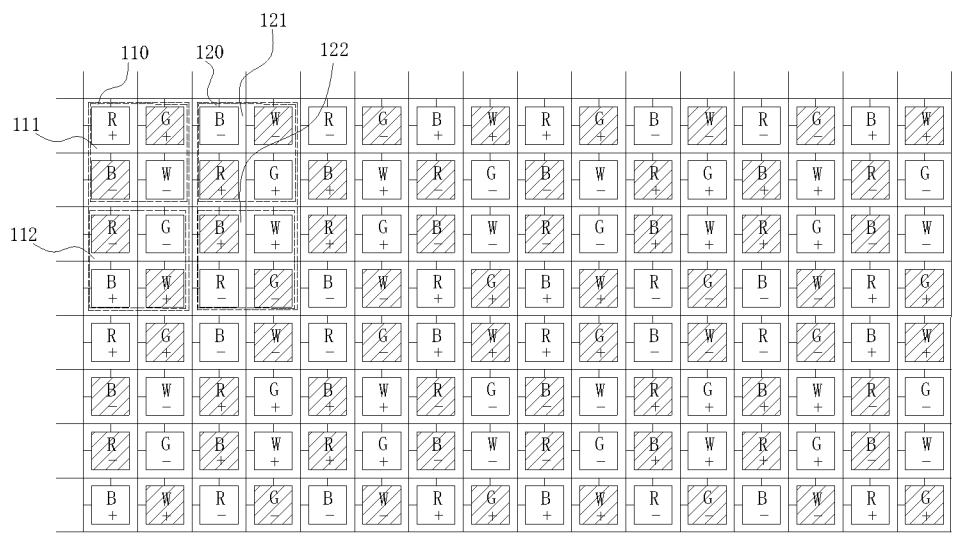

For instance, as shown in FIG. 27, in the first pixel 111, the second pixel 112, the third pixel 121 and the fourth pixel 122, the red subpixel, the green subpixel, the blue subpixel and the white subpixel are arranged as a square. The polarities of the red subpixel, the green subpixel, the blue subpixel and the white subpixel in the first pixel 111 respectively are positive, positive, negative and negative; polarities of the red subpixel, the green subpixel, the blue subpixel and the white subpixel in the second pixel 112 respectively are negative, negative, positive and positive; polarities of the blue subpixel, the white subpixel, the red subpixel and the green subpixel in the third pixel 121 respectively are negative, negative, positive and positive; polarities of the blue subpixel, the white subpixel, the red subpixel and the green subpixel in the fourth pixel 122 respectively are positive, positive, negative and negative. Moreover, the polarities of the red subpixel, the green subpixel, the blue subpixel and the white subpixel of the first pixel 111 can respectively be negative, negative, positive and positive. The polarities of the red subpixel, the green subpixel, the blue subpixel and the white subpixel in the second pixel 112 can respectively be positive, positive, negative and negative; polarities of the blue subpixel, the white subpixel, the red subpixel and the green subpixel in the third pixel 121 can respectively be positive, positive, negative and negative; polarities of the blue subpixel, the white subpixel, the red subpixel and the green subpixel in the fourth pixel 122 can respectively be negative, negative, positive and positive.

In some embodiments, in the first pixel 111, the second pixel 112, the third pixel 121 and the fourth pixel 122, the polarities of the data signals of the four subpixels in each of the pixels satisfy the polarities of the data signals of two adjacent subpixels in the same row are opposite, and the polarities of the data signals of two adjacent subpixels in the same column are opposite.

Figure 28:
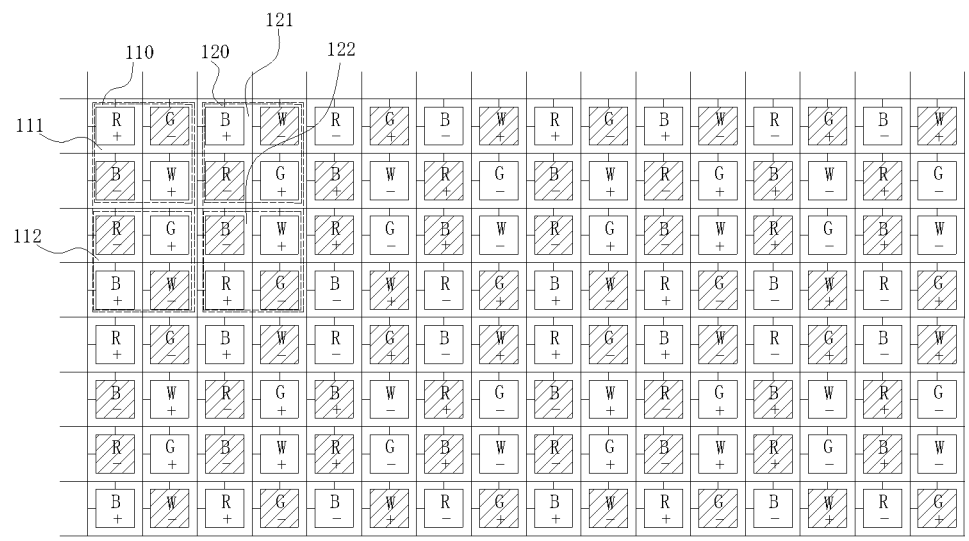

For instance, as shown in FIG. 28, in the first pixel 111, the second pixel 112, the third pixel 121 and the fourth pixel 122, the red subpixel, the green subpixel, the blue subpixel and the white subpixel are arranged as a square. The polarities of the red subpixel, the green subpixel, the blue subpixel and the white subpixel in the first pixel 111 respectively are positive, negative, negative and positive; polarities of the red subpixel, the green subpixel, the blue subpixel and the white subpixel in the second pixel 112 respectively are negative, positive, positive and negative; polarities of the blue subpixel, the white subpixel, the red subpixel and the green subpixel in the third pixel 121 respectively are positive, negative, negative and positive; polarities of the blue subpixel, the white subpixel, the red subpixel and the green subpixel in the fourth pixel 122 respectively are negative, positive, positive and negative.

The polarities of data signals of adjacent subpixels in the same row in the first pixel 111 and the third pixel 121 are opposite. Apparently, in other embodiments, the polarities of data signals of adjacent subpixels in the same row in the first pixel 111 and the third pixel 121 can further be the same.

Figure 29:
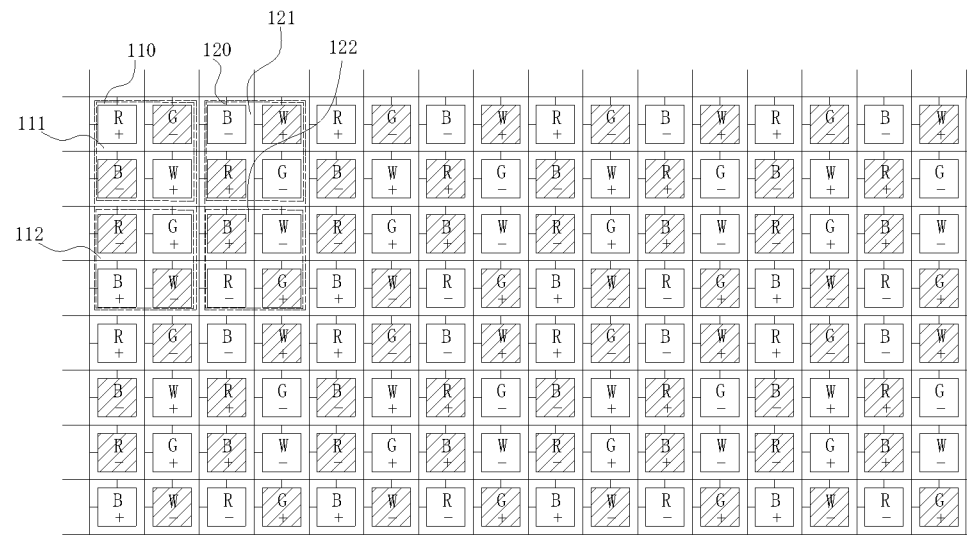

For instance, as shown in FIG. 29, in the first pixel 111, the second pixel 112, the third pixel 121 and the fourth pixel 122, the red subpixel, the green subpixel, the blue subpixel and the white subpixel are arranged as a square. The polarities of the red subpixel, the green subpixel, the blue subpixel and the white subpixel in the first pixel 111 respectively are positive, negative, negative and positive; polarities of the red subpixel, the green subpixel, the blue subpixel and the white subpixel in the second pixel 112 respectively are negative, positive, positive and negative; polarities of the blue subpixel, the white subpixel, the red subpixel and the green subpixel in the third pixel 121 respectively are negative, positive, positive and negative; polarities of the blue subpixel, the white subpixel, the red subpixel and the green subpixel in the fourth pixel 122 respectively are positive, negative, negative and positive. The green subpixel in the first pixel 111 and the blue subpixel in the third pixel 121 are adjacent subpixels in the same row, and the polarities thereof are the same. Therefore, the polarities of the data signals of adjacent subpixels in the same row in the first pixel 111 and the third pixel 121 in FIG. 29 can further be the same.

In some embodiments, in the first pixel 111, the second pixel 112, the third pixel 121 and the fourth pixel 122, the polarities of the data signals of the four subpixels in each of the pixels satisfy the polarities of the data signals of four subpixels in each of the pixels in the first pixel 111, the second pixel 112, the third pixel 121 and the fourth pixel 122 are the same; the polarities of the data signals of subpixels in the first pixel 111 and the third pixel 121 are opposite; the polarities of the data signals of subpixels in the second pixel 112 and the fourth pixel 122 are opposite.

Figure 30:
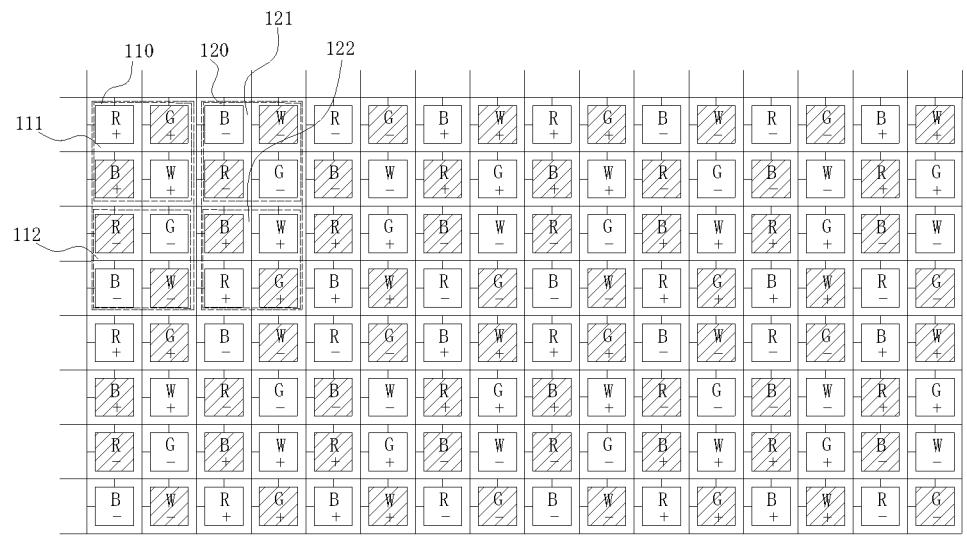

For instance, as shown in FIG. 30, in the first pixel 111, the second pixel 112, the third pixel 121 and the fourth pixel 122, the red subpixel, the green subpixel, the blue subpixel and the white subpixel are arranged as a square. The subpixels in the first pixel 111 are positive; the subpixels in the second pixel 112 are negative; the subpixels in the third pixel 121 are negative; the subpixels in the fourth pixel 122 are positive. In other embodiments, the subpixels in the first pixel 111 are negative; the subpixels in the second pixel 112 are positive; the subpixels in the third pixel 121 are positive; the subpixels in the fourth pixel 122 are negative.

Referring to FIG. 31 through FIG. 34, in the display panel shown in FIG. 31 through FIG. 34, two adjacent pixels in the same column adopt the same polarity driving manner. The display panel includes a substrate, and a subpixel array. The subpixel array includes pixels and data lines. The arrangement manners of the subpixels in the pixels in the same column are the same; the data lines are configured to input the first voltage data signal and the second voltage data signal to the subpixels in the pixels.

Figure 32:
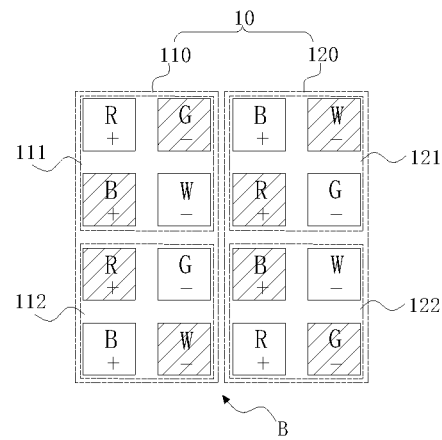
FIG. 32 is an enlarged schematic view of B in FIG. 31.

As shown in FIG. 32, the pixels include first pixels 111, second pixels 112, third pixels 121 and fourth pixels 122. The first pixel 111 and the second pixel 112 are in the same column to form the first pixel group 110; the third pixel 121 and the fourth pixel 122 are in the same column to form the second pixel group 120. The first pixel group 110 and the second pixel group 120 are arranged along the direction of the row of the subpixel array to form the pixel group 10. The pixel groups 10 are arranged in the directions of the row and the column to form the subpixel array.

In the embodiment, the arrangement manners of the subpixels in the first pixel group 110 and the second pixel group 120 are different. As shown in FIG. 32, the first pixel 111, the second pixel 112, the third pixel 121 and the fourth pixel 122 each include four subpixels, respectively are the red subpixel, the green subpixel, the blue subpixel and the white subpixel. The four subpixels are arranged in pair at top and bottom to form a square.

Specifically, as shown in FIG. 32, the red subpixel and the green subpixel are a pair; the blue subpixel and the white subpixel are a pair. In the first pixel group 110, the red subpixel and the green subpixel are on top of the square, the blue subpixel and the white subpixel are at the bottom of the square. In the second pixel group 120, the blue subpixel and the white subpixel are on top of the square, and the red subpixel and the green subpixel are at the bottom of the square.

In the embodiment, the pixel groups 10 in the same row are driven by the first polarity driving manner and the second polarity driving manner. To be specific, the first polarity driving manner and the second polarity driving manner drive alternately. The first polarity driving manner and the second polarity driving manner are opposite polarity driving manners, in other embodiments, the first polarity driving manner and the second polarity driving manner can be other driving manners without any limitation.

Figure 31:
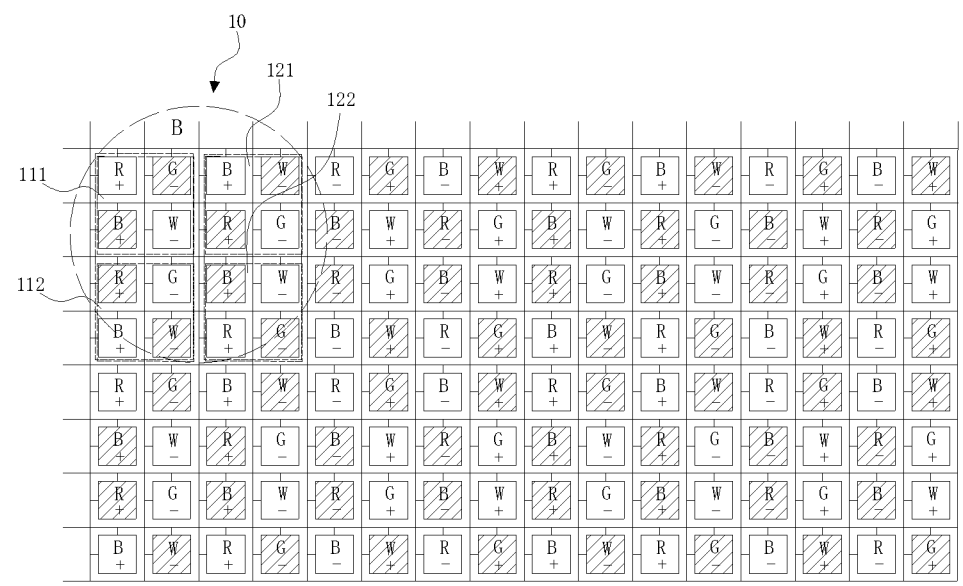
FIG. 31 is another structural schematic view of a display panel according to an embodiment of the disclosure.

In the embodiment, polarities of data signals of the subpixels in the same column are the same. The polarities of data signals of the subpixels in the first column in FIG. 31 are positive; the polarities of data signals of the subpixels in the second column are negative. The subpixels in the same column adopt the same polarity driving to prevent frequently switching of voltage signals of data lines for reducing the heat generated by driving chips, and simultaneously avoiding the influence on the high-low voltage switch when the display panel loads data signals to result in incomplete distortion of voltage signals to cause the insufficient pixel charges.

Figure 33:
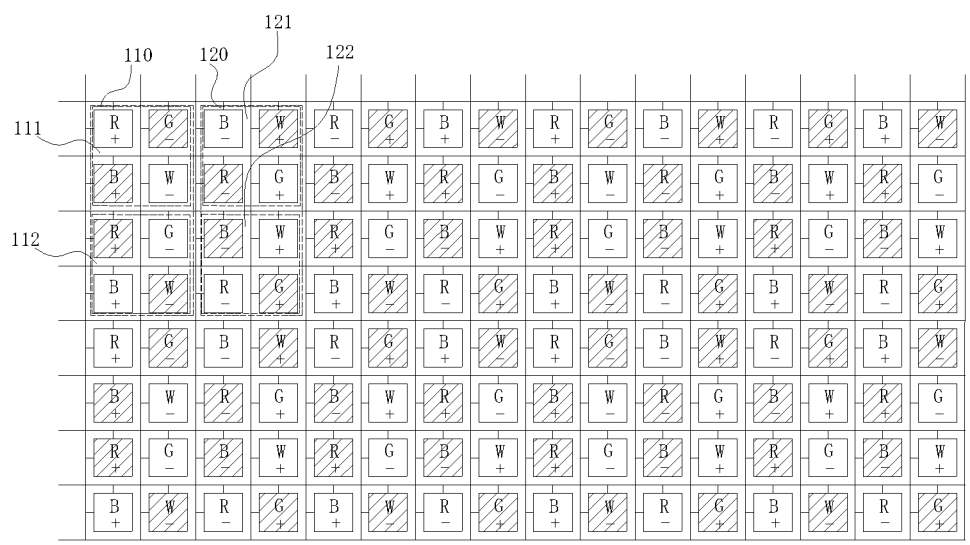
FIG. 33 and FIG. 34 are other structural schematic views of display panels according to embodiments of the disclosure.
Figure 34:
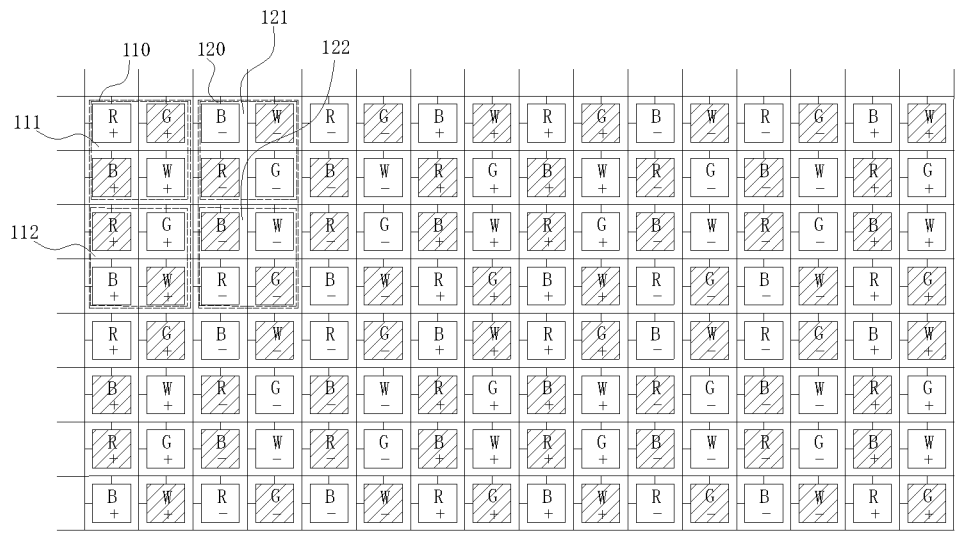

Comprehensively, in other embodiments, specific forms of the first polarity driving manner and the second polarity driving manner are not restricted to the polarity arrangement manners shown in FIG. 31, and other manners are adaptable, such as the manners shown in FIG. 33 through FIG. 34.

In the embodiment, as shown in FIG. 33, in the first pixel 111, the second pixel 112, the third pixel 121 and the fourth pixel 122, the red subpixel, the green subpixel, the blue subpixel and the white subpixel are arranged as a square. Polarities of the red subpixel, the green subpixel, the blue subpixel and the white subpixel in the first pixel 111 respectively are positive, negative, positive and negative; polarities of the red subpixel, the green subpixel, the blue subpixel and the white subpixel in the second pixel 112 respectively are positive, negative, positive and negative; polarities of the blue subpixel, the white subpixel, the red subpixel and the green subpixel in the third pixel 121 respectively are negative, positive, negative and positive; polarities of the blue subpixel, the white subpixel, the red subpixel and the green subpixel in the fourth pixel 122 respectively are negative, positive, negative and positive. In other embodiments, the polarities of the red subpixel, the green subpixel, the blue subpixel and the white subpixel in the first pixel 111 respectively are negative, positive, negative and positive; polarities of the red subpixel, the green subpixel, the blue subpixel and the white subpixel in the second pixel 112 respectively are negative, positive, negative and positive; polarities of the blue subpixel, the white subpixel, the red subpixel and the green subpixel in the third pixel 121 respectively are positive, negative, positive and negative; polarities of the blue subpixel, the white subpixel, the red subpixel and the green subpixel in the fourth pixel 122 respectively are positive, negative, positive and negative. The polarities of the data signals of the subpixels in the same column can be guaranteed to be the same.

In some embodiments, the polarities of data signals of the subpixels in the first pixel group 110 are the same; the polarities of data signals of the subpixels in the second pixel group 120 are the same; the polarities of data signals of the subpixels in the first pixel group and the second pixel group are opposite.

For instance, as shown in FIG. 34, in the first pixel 111, the second pixel 112, the third pixel 121 and the fourth pixel 122, the red subpixel, the green subpixel, the blue subpixel and the white subpixel are arranged as a square. The subpixels in the first pixel 111 are positive; the subpixels in the second pixel 112 are positive; the subpixels in the third pixel 121 are negative; the subpixels in the fourth pixel 122 are negative. The four subpixels in the first pixel 111 and four subpixels in the second pixel 112 can be negative; the four subpixels in the third pixel 121 and the four subpixels in the fourth pixel 122 can correspondingly be positive.

Figure 35:
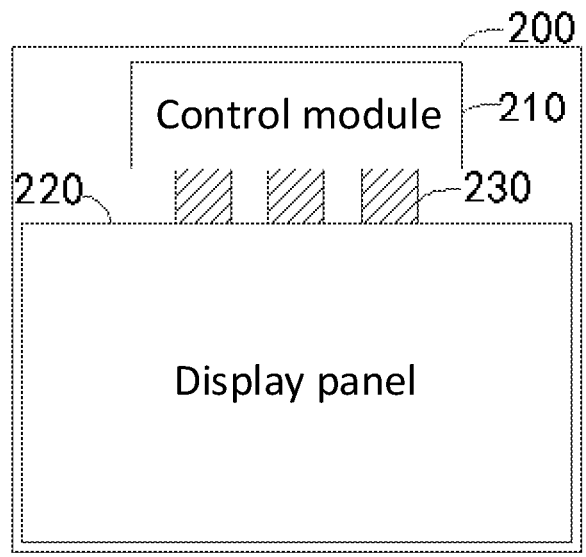
FIG. 35 is a structural schematic view of a display panel according to an embodiment of the disclosure.

Referring to FIG. 35, FIG. 35 is a structural schematic view of a display device of the disclosure. A display device 200 can be a liquid crystal display device, an organic light emitting diode (OLED) display device, a quantum dot light emitting diode (QLED) display device, a curved display device or other display devices. In a specific embodiment, a thin film transistor liquid crystal display may be available without any limitation herein.

The display device 200 includes a control module 210, a display panel 220 and a flexible circuit board 230. The display panel 220 and the control module 210 are coupled. Specifically, the display panel 220 is coupled with the control module 210 by the flexible circuit board 230.

In an embodiment, the flexible circuit board 230 can be the chip on film.

The display panel 220 can be any one of the display panels in the embodiments above. As the disclosure has illustrated the concrete structure and working principle of the display panel in detail, for the sake of simplifying the disclosure, no repeat will be offered herein.

Furthermore, the display device 200 shown in FIG. 35 is a display of the computer. Comprehensively, in other embodiments, the display device 200 can further be the display of a laptop or a mobile phone. The shape of the display device 200 shown in FIG. 35 is not restricted to the specific structure of the display device in the disclosure.

As the display device 200 of the embodiment adopts the display panel 220 of the disclosure, the problem of color shift of the large-sized display device 200 at wide angles can be solved. And the display device can be prevented from outputting images with color washout to upgrade output images; the output images can be prevented from error occurrence.

Figure 36:
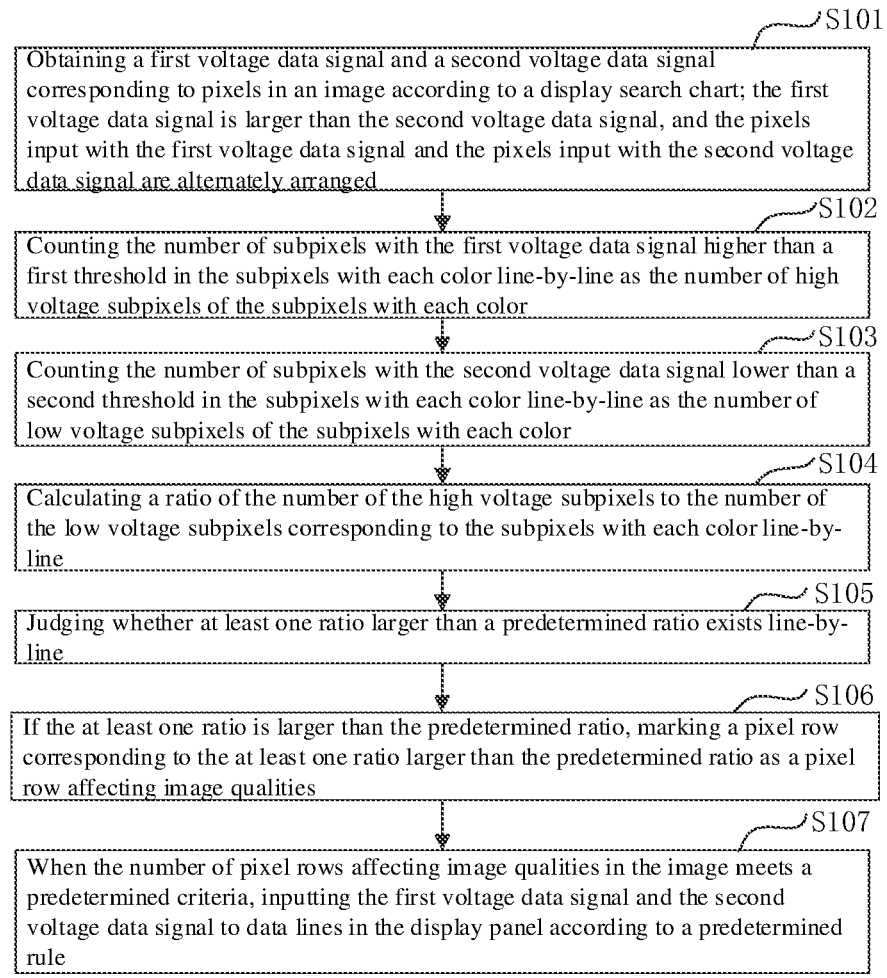
FIG. 36 is a schematic flowchart of a driving method according to an embodiment of the disclosure.

Referring to FIG. 36, FIG. 36 is a schematic flowchart of a driving method according to an embodiment of the disclosure. The driving method is for driving the display panel to show images. The driving method includes step S101 to step S107.

S101, a first voltage data signal and a second voltage data signal corresponding to pixels in an image are obtained according to a display search chart; the first voltage data signal is larger than the second voltage data signal, and the pixels input with the first voltage data signal and the pixels input with the second voltage data signal are alternately arranged.

In the embodiment, the first voltage data signal and the second voltage data signal corresponding to each of the pixels in an image can be obtained according to a display search chart. The first voltage data signal is larger than the second voltage data signal.

Figure 37:
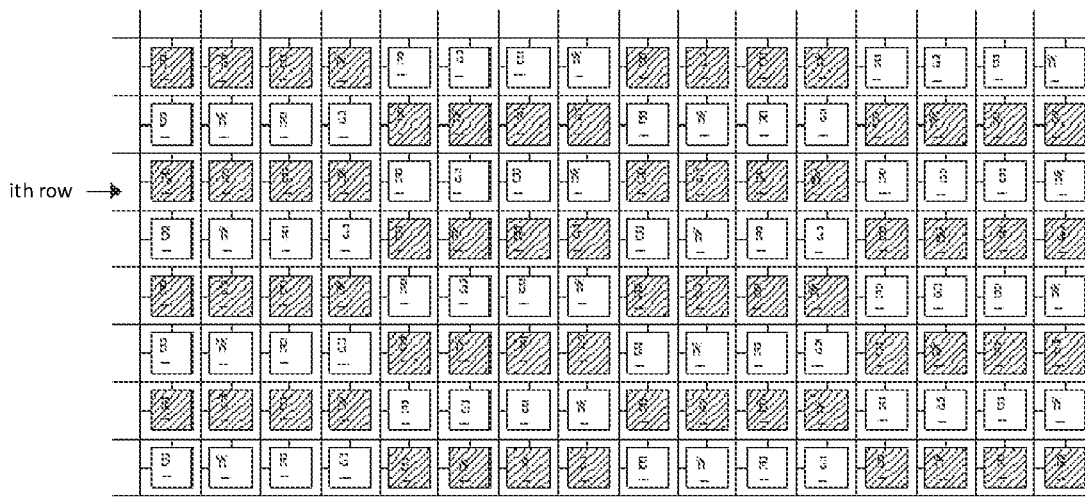
FIG. 37 is a schematic view of a pixel structure corresponding to the driving method shown in FIG. 36.

Referring to FIG. 37, FIG. 37 is a structural schematic view of a pixel in step S101 in the driving method shown in FIG. 36. In FIG. 37, the pixels input with the first voltage data signal are marked with oblique lines, and the pixels input with the second voltage data signal are not marked with oblique lines. In the directions of the row and the column, the pixels input with the first voltage data signal and the pixels input with the second voltage data signal are arranged alternately. Specifically, one pixel input with the second voltage data signal is disposed between two adjacent pixels input with the first voltage data signal, and one pixel input with the first voltage data signal is disposed between two adjacent pixels input with the second voltage data signal.

Furthermore, according to the arrangement manner of pixels shown in FIG. 37, voltage polarities corresponding to pixels adopt the manner of point reversion. Comprehensively, other manners such as column reversion is optional, no limitation will be defined herein. Meanwhile, the number of subpixels included in each of the pixels is not restricted to four like a red subpixel, a green subpixel, a blue subpixel and a white subpixel. The number of subpixels included in each of the pixels can further be three like a red subpixel, a green subpixel and a blue subpixel, without further limitation.

S102, the number of subpixels with the first voltage data signal higher than a first threshold in the subpixels with each color is counted line-by-line as the number of high voltage subpixels of the subpixels with each color.

In the embodiment, the first threshold can be determined according to characteristics of the display panel. When the first threshold is larger, the pixels corresponding to the second voltage data signal is less affected by the pixels corresponding to the first voltage data signal in the image of the display panel. The specific value of the first threshold is not limited herein.

As shown in FIG. 37, taking the ith row as an example, the number of subpixels with the first voltage data signal higher than the first threshold in the subpixels with each color in the ith row is counted as the number of high voltage subpixels of the subpixels with each color. Among the pixels in the ith row, the number of high voltage subpixels each corresponding to the red subpixels, the green subpixels, the blue subpixels and the white subpixels sequentially are marked as $R_i^h$, $G_i^h$, $B_i^h$, and $W_i^h$. The number of high voltage subpixels corresponding to the subpixels with each color in each row of pixels in the entire image can be obtained according to step S102.

S103, the number of subpixels with the second voltage data signal lower than a second threshold in the subpixels with each color is counted line-by-line as the number of low voltage subpixels of the subpixels with each color.

In the embodiment, the second threshold can be determined according to characteristics of the display panel. When the second threshold is smaller, the pixels corresponding to the second voltage data signal is less affected by the pixels corresponding to the first voltage data signal in the image of the display panel. The specific value of the second threshold is not limited herein.

As shown in FIG. 37, taking the ith row as an example, the number of subpixels with the second voltage data signal lower than the second threshold in the subpixels with each color in the ith row is counted as the number of low voltage subpixels of the subpixels with each color. Among the pixels in the ith row, the number of low voltage subpixels each corresponding to the red subpixels, the green subpixels, the blue subpixels and the white subpixels sequentially are marked as $R_i^L$, $G_i^L$, $B_i^L$, and $W_i^L$. The number of low voltage subpixels corresponding to the subpixels with each color in each row of pixels in the entire image can be obtained according to step S103.

S104, a ratio of the number of the high voltage subpixels to the number of the low voltage subpixels corresponding to the subpixels with each color is calculated line-by-line.

As shown in FIG. 37, taking the ith row as an example, a ratio of the number of the high voltage subpixels to the number of the low voltage subpixels corresponding to the subpixels with each color is calculated in the ith row. In the pixels in the ith row, the ratios corresponding to the red subpixels, the green subpixels, the blue subpixels and the white subpixels sequentially are marked as:

$$X_i^R = \frac{R_i^h}{R_i^L}, X_i^G = \frac{G_i^h}{G_i^L}, X_i^B = \frac{B_i^h}{B_i^L}, \text{ and } X_i^W = \frac{W_i^h}{W_i^L}.$$

According to the calculation method of ratios corresponding to the subpixels with each color in the ith row, ratios corresponding to the subpixels with each color in other rows of the pixels can be obtained.

S105, judging whether at least one ratio larger than a predetermined ratio exists line-by-line.

After obtaining the ratios corresponding to the subpixels with each color in each row of the pixels, whether at least one ratio larger than a predetermined ratio exists will be judged line-by-line. For instance, taking the pixels in the ith row in FIG. 37 as an example, judging whether at least one ratio larger than the predetermined ratio exists in the ratios corresponding to the red subpixels, the green subpixels, the blue subpixels and the white subpixels among the pixel in the ith row, in other words, judging if any value of four ratios $X_i^R$, $X_i^G$, $X_i^B$, and $X_i^W$ in the ith row of pixel is larger than the predetermined ratio, and if a value is larger than the predetermined ratio, the step S106 will be executed.

Furthermore, the predetermined ratio can be adjusted according to the properties of the display panel, and no limitation will be given here.

S106, if at least one ratio is larger than the predetermined ratio, a pixel row corresponding to the at least one ratio larger than the predetermined ratio is marked as a pixel row affecting image qualities.

If one row of pixel has at least one ratio larger than the predetermined ratio, the pixel row is marked as a pixel row affecting image qualities. For instance, the ratio of $X_i^R$ in the ith row is larger than the predetermined ratio; the ith row of pixel will be marked as the pixel row affecting image qualities.

S107, when the number of pixel rows affecting image qualities in the image meets a predetermined criteria, inputting the first voltage data signal and the second voltage data signal to data lines in the display panel according to a predetermined rule to achieve any one of the display panels of the disclosure.

After the step S105 and the step S106, all the pixel rows affecting image qualities in the entire image can be marked out. The number of pixel rows affecting image qualities in the entire image is judged whether to meet the predetermined value.

In an embodiment, judging whether the number of pixel rows affecting image qualities in the entire image meets the predetermined value includes: judging whether the number of pixel rows affecting image qualities in successive pixel rows exceeds the first predetermined value; if the number of pixel rows affecting image qualities in successive pixel rows exceeds the first predetermined value, the number of pixel rows affecting image qualities in the image is determined to satisfy the predetermined condition.

In another embodiment, judging whether the number of pixel rows affecting image qualities in the entire image meets the predetermined value includes: judging whether the number of pixel rows affecting image qualities in successive pixel rows exceeds the second predetermined value; if the number of pixel rows affecting image qualities in successive pixel rows exceeds the second predetermined value, the number of pixel rows affecting image qualities in the image is determined to satisfy the predetermined condition. If the number of pixel rows affecting image qualities in the image is judged to satisfy the predetermined condition, the data lines of the display panel is needed to be input with the first voltage data signal and the second voltage data signal to achieve the display panel of the disclosure, further preventing the pixels corresponding to the second voltage data signal from being severely influenced by the pixels corresponding to the first voltage data signal. The display images can be prevented from severe color shift to guarantee the quality of the display images.

Furthermore, the driving method in the embodiment can be adaptive to the pixel including four subpixels, as well as the pixel including three subpixels.

The driving method in the embodiment can effectively prevent the display panel from generating severe color shift during displaying images and enhance the quality of display images.

The descriptions above purely are concrete embodiments of the disclosure, but the protective scope of the disclosure is not limited as such. A person skilled in the art can easily obtain various equivalent modifications or substitutions within the technical scope disclosed by the disclosure. The modifications or substitutions should be included in the protective scope of the disclosure. Therefore, the protective scope of the disclosure should be based on the protective scope of claims.

What is claimed is:

1. A driving method, for driving a display panel, wherein the driving method comprises:

obtaining a first voltage data signal and a second voltage data signal corresponding to pixels in an image according to a display search chart; wherein the first voltage data signal is larger than the second voltage data signal, and the pixels input with the first voltage data signal and the pixels input with the second voltage data signal are alternately arranged;

counting the number of subpixels with the first voltage data signal higher than a first threshold in the subpixels with each color line-by-line as the number of high voltage subpixels of the subpixels with each color;

counting the number of subpixels with the second voltage data signal lower than a second threshold in the subpixels with each color line-by-line as the number of low voltage subpixels of the subpixels with each color;

calculating a ratio of the number of the high voltage subpixels to the number of the low voltage subpixels corresponding to the subpixels with each color line-by-line;

judging whether at least one ratio larger than a predetermined ratio exists line-by-line;

if the at least one ratio is larger than the predetermined ratio, marking a pixel row corresponding to the at least one ratio larger than the predetermined ratio as a pixel row affecting image qualities;

when the number of pixel rows affecting image qualities in the image meets a predetermined criteria, inputting the first voltage data signal and the second voltage data signal to data lines in the display panel according to a predetermined rule to achieve a display panel comprising:

a substrate, wherein the substrate is formed with active switches;

a subpixel array, disposed on the substrate, comprising a plurality of subpixels;

a plurality of data lines, configured to input a first voltage data signal and a second voltage data signal to the plurality of subpixels; wherein the plurality of data lines and the active switches are coupled;

wherein a voltage of the first voltage data signal is larger than a voltage of the second voltage data signal; the plurality of subpixels input with the first voltage data signal and the plurality of subpixels input with the second voltage data signal are alternately arranged; among the plurality of subpixels with a same color in a same row, the number of the plurality of subpixels input with the first voltage data signal with a positive polarity is equal to the number of the plurality of subpixels input with the first voltage data signal with a negative polarity.

2. The driving method according to claim 1, wherein inputting the first voltage data signal and the second voltage data signal to the data lines in the display panel when the number of the pixel rows affecting image qualities in the image meets the predetermined criteria comprises:

when the number of the pixel rows affecting image qualities among successive pixel rows exceeds a first predetermined value, inputting the first voltage data signal and the second voltage data signal to the data lines of the display panel according to the predetermined rule.

3. The driving method according to claim 1, inputting the first voltage data signal and the second voltage data signal to the data lines in the display panel when the number of the pixel rows affecting image qualities in the image meets the predetermined criteria comprises:

when the number of the pixel rows affecting image qualities in the image exceeds a second predetermined value, inputting the first voltage data signal and the second voltage data signal to the data lines of the display panel according to the predetermined rule.

4. The driving method according to claim 1, wherein first threshold and the second threshold are determined according to properties of the display panel.

* * * * *